United States Patent
Ellis

(10) Patent No.: US 8,855,828 B2
(45) Date of Patent: Oct. 7, 2014

(54) FACILITATING DISTRIBUTED POWER PRODUCTION UNITS IN A POWER GROUP TO STORE POWER FOR POWER CONDITIONING DURING AN ANTICIPATED TEMPORARY POWER PRODUCTION DISRUPTION

(75) Inventor: Jason Lee Ellis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 13/356,018

(22) Filed: Jan. 23, 2012

(65) Prior Publication Data

US 2013/0046413 A1     Feb. 21, 2013

Related U.S. Application Data

(60) Provisional application No. 61/525,512, filed on Aug. 19, 2011.

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| H02J 7/35 | (2006.01) |

(52) U.S. Cl.
CPC ........................................ *H02J 7/35* (2013.01)
USPC ........................... 700/286; 700/291; 700/295

(58) Field of Classification Search
USPC .................. 700/286, 291, 295, 297; 705/412
See application file for complete search history.

(56) References Cited

U.S. PATENT DOCUMENTS

| | | | |
|---|---|---|---|
| 4,636,931 A | 1/1987 | Takahashi et al. | |
| 5,237,507 A | 8/1993 | Chasek | |
| 6,925,361 B1 | 8/2005 | Sinnock | |
| 7,274,975 B2 | 9/2007 | Miller | |
| 7,385,373 B2 | 6/2008 | Doruk et al. | |
| 7,580,817 B2 * | 8/2009 | Bing | 703/6 |
| 7,778,940 B2 | 8/2010 | Mazzarella | |
| 8,295,989 B2 * | 10/2012 | Rettger et al. | 700/291 |

(Continued)

FOREIGN PATENT DOCUMENTS

| | | |
|---|---|---|
| EP | 1986306 A1 | 10/2008 |
| JP | 2011101553 A | 5/2011 |

OTHER PUBLICATIONS

International Search Report and Written Opinion—PCT/US2012/051560—ISA/EPO—Jan. 21, 2013.

*Primary Examiner* — Ronald Hartman, Jr.
(74) *Attorney, Agent, or Firm* — Gerald P. Joyce, III

(57) ABSTRACT

In an embodiment, a server monitors a set of parameters associated with future power production capacity of a set of distributed power production units that belong to a power group supplying power to a given serving area of a power grid during a given period of time. The server predicts, for a portion of the given period of time, a temporary power production disruption that will affect the power group based on the monitoring. The server sends a control message to the power group based on the prediction. At least one power production unit in the power group receives the control message, and responsive to the control message diverts at least a portion of power being supplied to the given serving area to local storage, detects the temporary power disruption and conditions power supplied to the given serving area during the temporary power distribution based upon the locally stored power.

18 Claims, 19 Drawing Sheets

(56) References Cited

U.S. PATENT DOCUMENTS

| | | |
|---|---|---|
| 8,364,287 B2 * | 1/2013 | Pearson et al. ............... 700/11 |
| 2004/0128266 A1 | 7/2004 | Yellepeddy et al. |
| 2009/0040029 A1 | 2/2009 | Bridges et al. |
| 2009/0234511 A1 * | 9/2009 | Ouchi et al. ............... 700/291 |
| 2010/0138063 A1 * | 6/2010 | Cardinal et al. ............ 700/291 |
| 2010/0306027 A1 * | 12/2010 | Haugh ......................... 705/10 |
| 2011/0055036 A1 | 3/2011 | Helfan |
| 2011/0082597 A1 | 4/2011 | Meagher |
| 2011/0137475 A1 * | 6/2011 | Al-Mazeedi ................ 700/287 |
| 2011/0282514 A1 * | 11/2011 | Ropp et al. .................. 700/297 |
| 2011/0307109 A1 * | 12/2011 | Sri-Jayantha .............. 700/291 |
| 2012/0130556 A1 * | 5/2012 | Marhoefer ................... 700/291 |
| 2012/0209439 A1 * | 8/2012 | Inoue et al. ................. 700/291 |
| 2012/0271470 A1 * | 10/2012 | Flynn et al. ................. 700/292 |
| 2013/0046415 A1 * | 2/2013 | Curtis ......................... 700/297 |

* cited by examiner

"TIME 1"

"TIME 2"

"TIME 3"

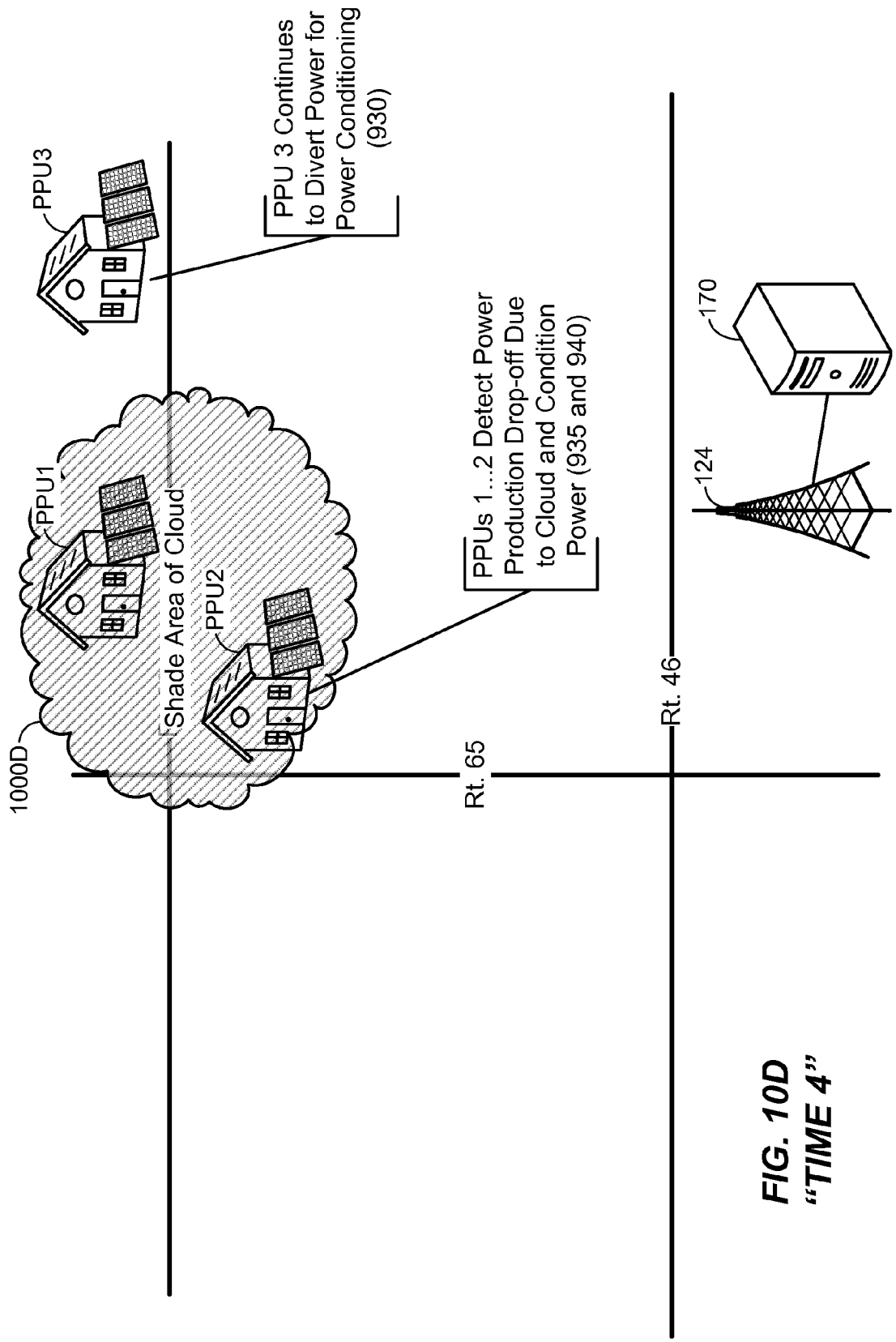
FIG. 10D "TIME 4"

"TIME 5"

"TIME 6"

FACILITATING DISTRIBUTED POWER PRODUCTION UNITS IN A POWER GROUP TO STORE POWER FOR POWER CONDITIONING DURING AN ANTICIPATED TEMPORARY POWER PRODUCTION DISRUPTION

CLAIM OF PRIORITY UNDER 35 U.S.C. §119

The present application for patent claims priority to Provisional Application No. 61/525,512 entitled "NEGOTIATING POWER PRODUCTION RATES FOR A GROUP OF POWER PRODUCTION UNITS", filed Aug. 19, 2011, and assigned to the assignee hereof and hereby expressly incorporated by reference herein.

BACKGROUND OF THE INVENTION

1. Field of the Invention

Embodiments of the invention relate to facilitating power production units in a power group to store power for power conditioning during an anticipated temporary power production disruption.

2. Description of the Related Art

Conventional power distribution systems rely upon a small group of centralized commercial power utilities (e.g., coal-fired power plants, nuclear power plants, centralized renewable facilities such as commercial solar plants or commercial wind farms, etc.) producing power that is fed into a power grid and distributed to power consuming units or loads (e.g., homes, offices, etc.) throughout a wide serving area of a power grid system.

Increasingly, distributed power production units are being deployed in power grid systems. For example, photovoltaic or solar panels can be mounted onto a roof of a residential home or office building and then tied to the power grid so that the home or office building becomes a new power producer instead of (or in addition to being) a consumer. In another example, wind farms (i.e., groups of wind turbines) can also be tied into the grid as a net power producer.

Older power grid system had no mechanism by which operators of distributed power production units could be compensated for the power that they supported to the power grid system. However, some newer power grid systems in certain municipalities implement a relatively simple crediting system referred to as "net metering". In a net metering system, the amount of net power supplied to the power grid system for a particular power production unit is monitored and a fixed pre-negotiated net metering rate is credited to the operator of the power production unit. However, conventional net metering is not based on the actual real-time power demands of the power grid system. For example, under conventional net metering, an operator of a solar power production unit which provides most of its power during the day when capacity of the power grid system is strained is compensated at the same rate as an operator of a windmill that produces power at night during off-peak hours. Further, some commercial power utilities are now considering charging operators of distributed power production units participation fees associated with the net metering crediting mechanism.

Accordingly, at present, there is no apparent mechanism by which individual operators of distributed power production units are incentivized to produce power when power demand in proximity to the distributed power production units is high or to establish oversized distributed power production beyond their own consumption needs.

SUMMARY

In an embodiment, a server monitors a set of parameters associated with future power production capacity of a set of distributed power production units that belong to a power group supplying power to a given serving area of a power grid during a given period of time. The server predicts, for a portion of the given period of time, a temporary power production disruption that will affect the power group based on the monitoring. The server sends a control message to the power group based on the prediction. At least one power production unit in the power group receives the control message, and responsive to the control message diverts at least a portion of power being supplied to the given serving area to local storage, detects the temporary power disruption and conditions power supplied to the given serving area during the temporary power distribution based upon the locally stored power.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which:

FIGS. 10A through 10F each illustrate an example implementation of a portion of the process of FIG. 9 whereby the temporary power disruption corresponds to temporary cloud cover in proximity to the power group.

DETAILED DESCRIPTION

Figure 1:
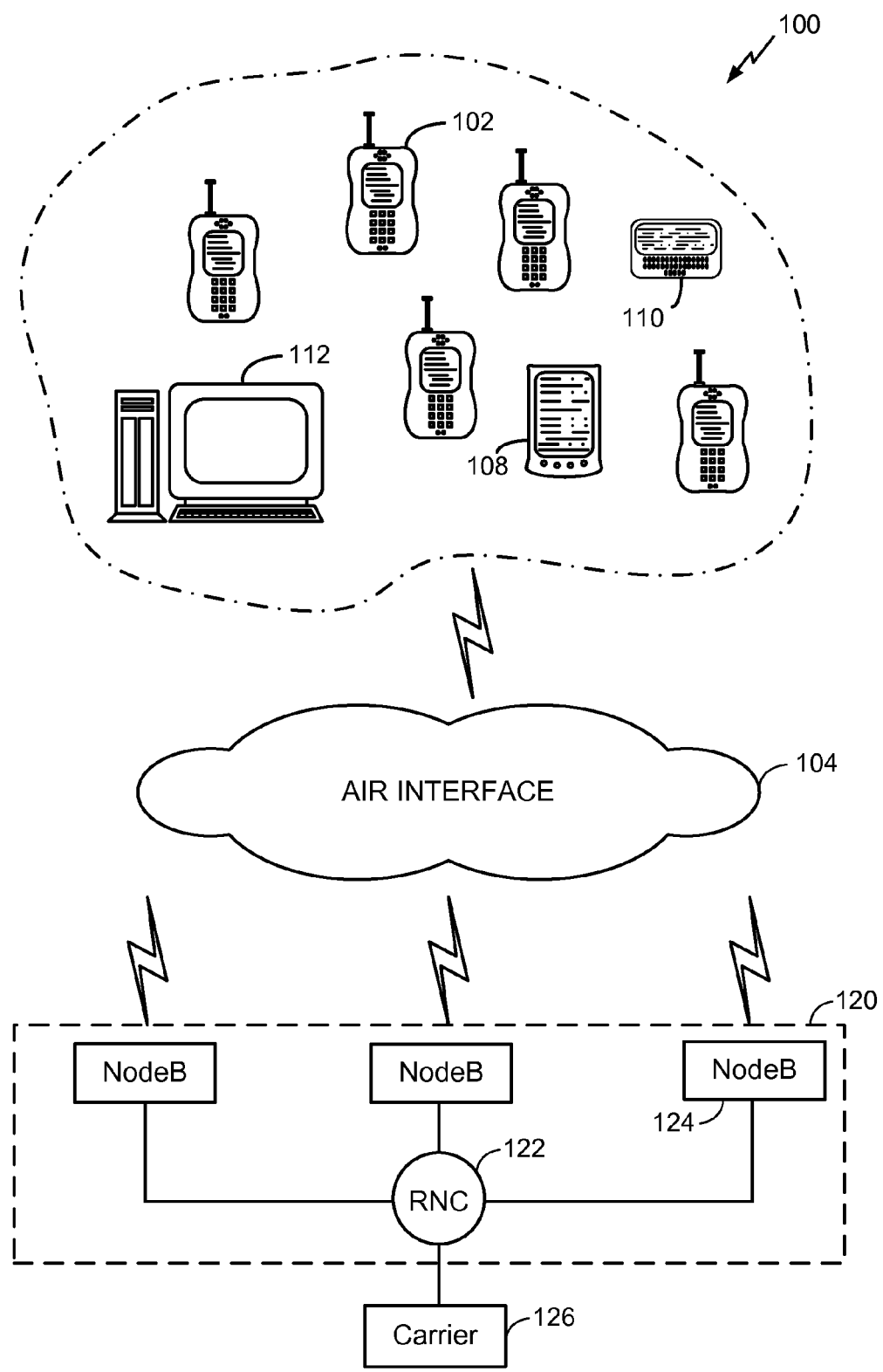
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple access terminals.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the UE 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of UE including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal", "AT", "wireless device", "client device", "mobile terminal", "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2A:
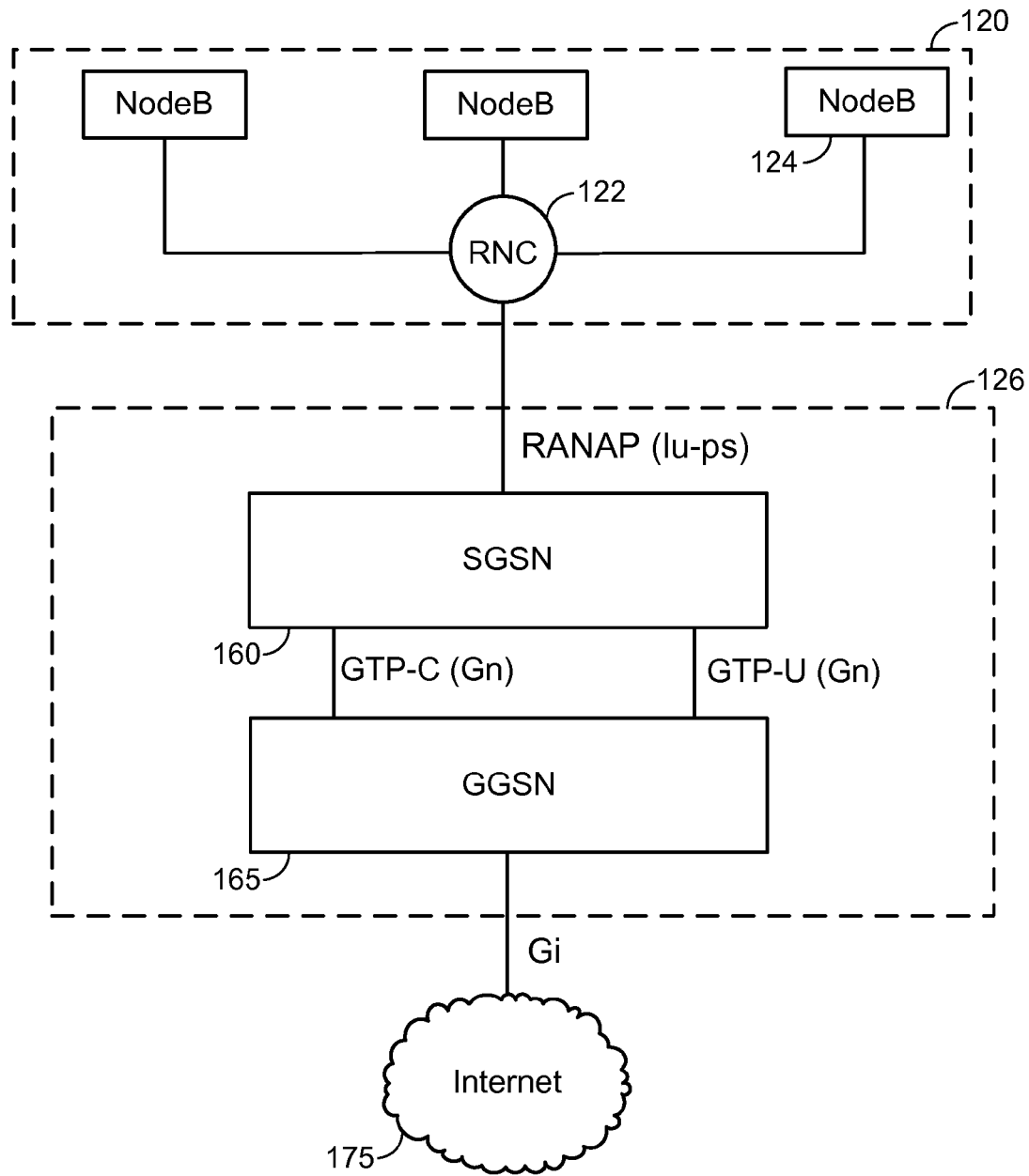
FIG. 2A illustrates the core network of FIG. 1 according to an embodiment of the present invention.

FIG. 2A illustrates the core network 126 according to an embodiment of the present invention. In particular, FIG. 2A illustrates components of a General Packet Radio Services (GPRS) core network implemented within a W-CDMA system. In the embodiment of FIG. 2A, the core network 126 includes a Serving GPRS Support Node (SGSN) 160, a Gateway GPRS Support Node (GGSN) 165 and an Internet 175. However, it is appreciated that portions of the Internet 175 and/or other components may be located outside the core network in alternative embodiments.

Generally, GPRS is a protocol used by Global System for Mobile communications (GSM) phones for transmitting Internet Protocol (IP) packets. The GPRS Core Network (e.g., the GGSN 165 and one or more SGSNs 160) is the centralized part of the GPRS system and also provides support for W-CDMA based 3G networks. The GPRS core network is an integrated part of the GSM core network, provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the internet as if from one location at the GGSN 165. This is achieved transferring the subscriber's data from the subscriber's current SGSN 160 to the GGSN 165, which is handling the subscriber's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2A, the GGSN 165 acts as an interface between the GPRS backbone network (not shown) and the external packet data network 175. The GGSN 165 extracts the packet data with associated packet data protocol (PDP) format (e.g., IP or PPP) from the GPRS packets coming from the SGSN 160, and sends the packets out on a corresponding packet data network. In the other direction, the incoming data packets are directed by the GGSN 165 to the SGSN 160 which manages and controls the Radio Access Bearer (RAB) of the destination UE served by the RAN 120. Thereby, the GGSN 165 stores the current SGSN address of the target UE and his/her profile in its location register (e.g., within a PDP context). The GGSN is responsible for IP address assignment and is the default router for the connected UE. The GGSN also performs authentication and charging functions.

The SGSN 160 is representative of one of many SGSNs within the core network 126, in an example. Each SGSN is responsible for the delivery of data packets from and to the UEs within an associated geographical service area. The tasks of the SGSN 160 includes packet routing and transfer, mobility management (e.g., attach/detach and location management), logical link management, and authentication and charging functions. The location register of the SGSN stores location information (e.g., current cell, current VLR) and user profiles (e.g., IMSI, PDP address(es) used in the packet data network) of all GPRS users registered with the SGSN 160, for example, within one or more PDP contexts for each user or UE. Thus, SGSNs are responsible for (i) de-tunneling downlink GTP packets from the GGSN 165, (ii) uplink tunnel IP packets toward the GGSN 165, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in Universal Mobile Telecommunications System (UMTS) system architecture) communicates with the SGSN 160 via a Radio Access Network Application Part (RANAP) protocol. RANAP operates over a Iu interface (Iu-ps), with a transmission protocol such as Frame Relay or IP. The SGSN 160 communicates with the GGSN 165 via a Gn interface, which is an IP-based interface between SGSN 160 and other SGSNs (not shown) and internal GGSNs, and uses the GTP protocol defined above (e.g., GTP-U, GTP-C, GTP', etc.). In the embodiment of FIG. 2A, the Gn between the SGSN 160 and the GGSN 165 carries both the GTP-C and the GTP-U. While not shown in FIG. 2A, the Gn interface is also used by the Domain Name System (DNS). The GGSN 165 is connected to a Public Data Network (PDN) (not shown), and in turn to the Internet 175, via a Gi interface with IP protocols either directly or through a Wireless Application Protocol (WAP) gateway.

Figure 2B:
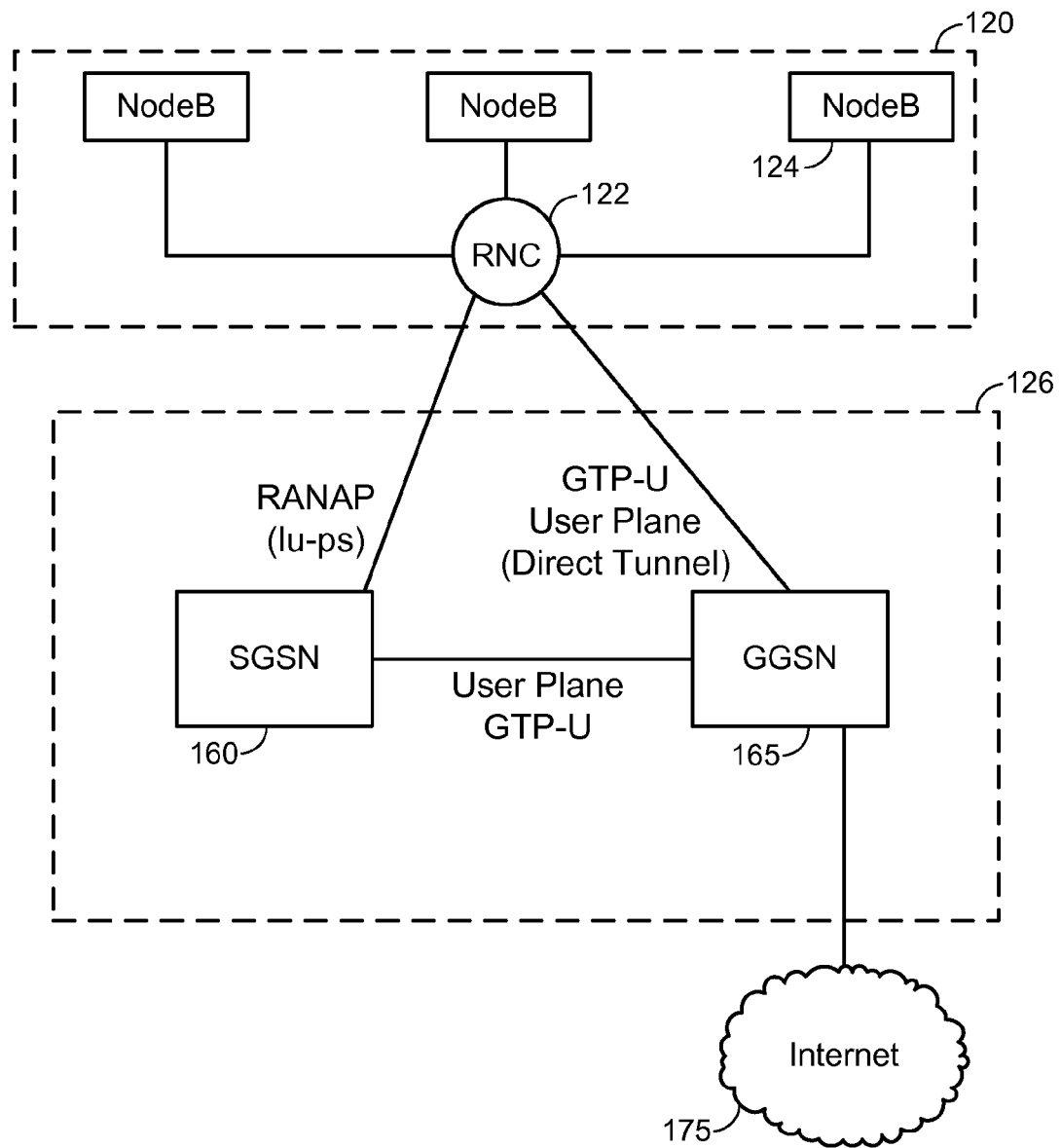
FIG. 2B illustrates the core network of FIG. 2A according to another embodiment of the present invention.

FIG. 2B illustrates the core network 126 according to another embodiment of the present invention. FIG. 2B is similar to FIG. 2A except that FIG. 2B illustrates an implementation of direct tunnel functionality.

Direct Tunnel is an optional function in Iu mode that allows the SGSN 160 to establish a direct user plane tunnel, GTP-U, between RAN and GGSN within the Packet Switched (PS) domain. A direct tunnel capable SGSN, such as SGSN 160 in FIG. 2B, can be configured on a per GGSN and per RNC basis whether or not the SGSN can use a direct user plane connection. The SGSN 160 in FIG. 2B handles the control plane signaling and makes the decision of when to establish Direct Tunnel. When the Radio Bearer (RAB) assigned for a PDP context is released (i.e. the PDP context is preserved) the GTP-U tunnel is established between the GGSN 165 and SGSN 160 in order to be able to handle the downlink packets.

The optional Direct Tunnel between the SGSN 160 and GGSN 165 is not typically allowed (i) in the roaming case (e.g., because the SGSN needs to know whether the GGSN is in the same or different PLMN), (ii) where the SGSN has received Customized Applications for Mobile Enhanced Logic (CAMEL) Subscription Information in the subscriber profile from a Home Location Register (HLR) and/or (iii) where the GGSN 165 does not support GTP protocol version 1. With respect to the CAMEL restriction, if Direct Tunnel is established then volume reporting from SGSN 160 is not possible as the SGSN 160 no longer has visibility of the User Plane. Thus, since a CAMEL server can invoke volume reporting at anytime during the life time of a PDP Context, the use of Direct Tunnel is prohibited for a subscriber whose profile contains CAMEL Subscription Information.

The SGSN 160 can be operating in a Packet Mobility Management (PMM)-detached state, a PMM-idle state or a PMM-connected state. In an example, the GTP-connections shown in FIG. 2B for Direct Tunnel function can be established whereby the SGSN 160 is in the PMM-connected state and receives an Iu connection establishment request from the UE. The SGSN 160 ensures that the new Iu connection and the existing Iu connection are for the same UE, and if so, the SGSN 160 processes the new request and releases the existing Iu connection and all RABs associated with it. To ensure that the new Iu connection and the existing one are for the same UE, the SGSN 160 may perform security functions. If Direct Tunnel was established for the UE, the SGSN 160 sends an Update PDP Context Request(s) to the associated GGSN(s) 165 to establish the GTP tunnels between the SGSN 160 and GGSN(s) 165 in case the Iu connection establishment request is for signaling only. The SGSN 160 may immediately establish a new direct tunnel and send Update PDP Context Request(s) to the associated GGSN(s) 165 and include the RNC's Address for User Plane, a downlink Tunnel Endpoint Identifier (TEID) for data in case the Iu connection establishment request is for data transfer.

The UE also performs a Routing Area Update (RAU) procedure immediately upon entering PMM-IDLE state when the UE has received a RRC Connection Release message with cause "Directed Signaling connection re-establishment" even if the Routing Area has not changed since the last update. In an example, the RNC will send the RRC Connection Release message with cause "Directed Signaling Connection re-establishment" when it the RNC is unable to contact the Serving RNC to validate the UE due to lack of Iur connection (e.g., see TS 25.331 [52]). The UE performs a subsequent service request procedure after successful completion of the RAU procedure to re-establish the radio access bearer when the UE has pending user data to send.

The PDP context is a data structure present on both the SGSN 160 and the GGSN 165 which contains a particular UE's communication session information when the UE has an active GPRS session. When a UE wishes to initiate a GPRS communication session, the UE must first attach to the SGSN 160 and then activate a PDP context with the GGSN 165. This allocates a PDP context data structure in the SGSN 160 that the subscriber is currently visiting and the GGSN 165 serving the UE's access point.

Figure 2C:
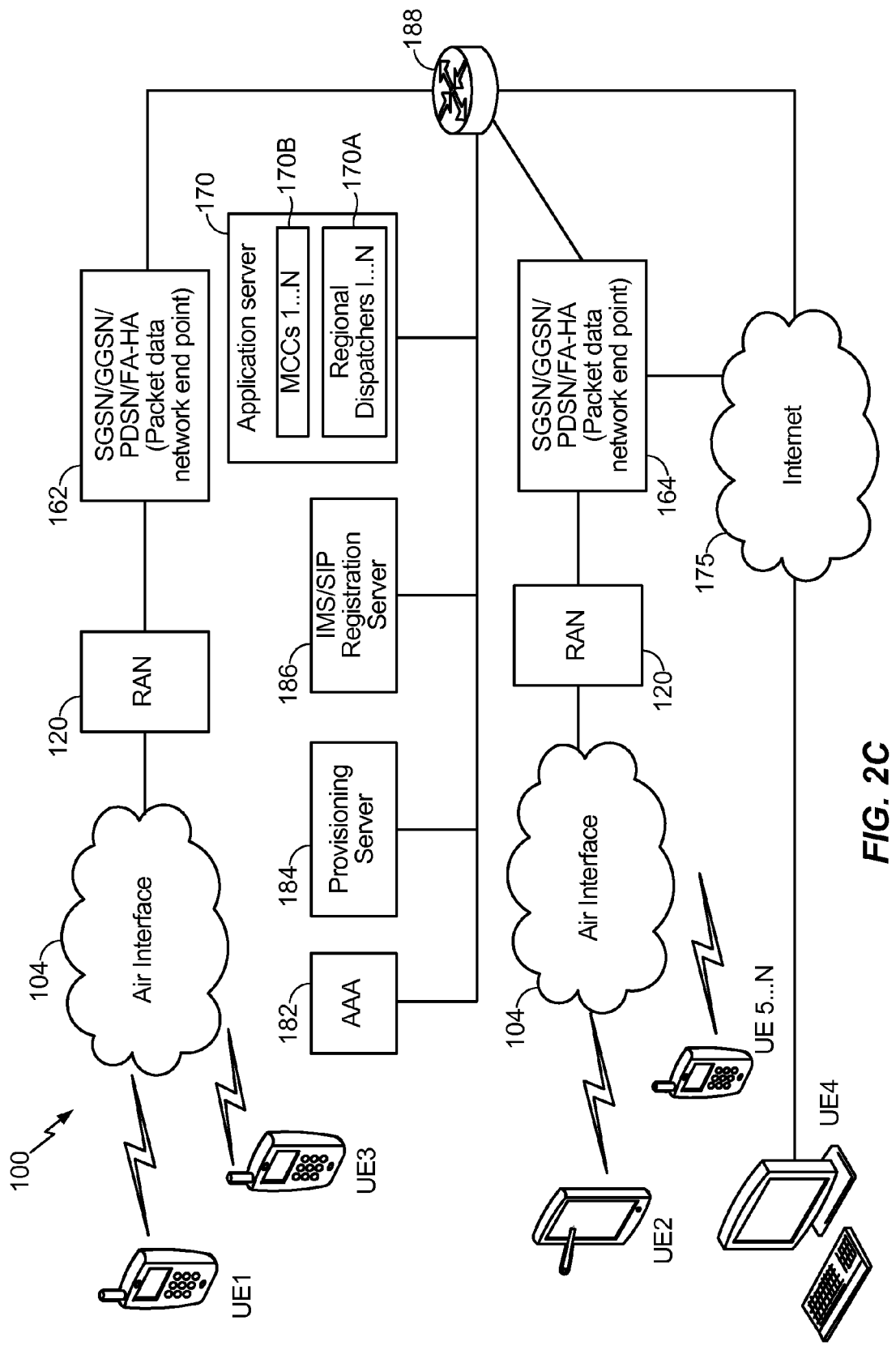
FIG. 2C illustrates an example of the wireless communications system of FIG. 1 in more detail.

FIG. 2C illustrates an example of the wireless communications system 100 of FIG. 1 in more detail. In particular, referring to FIG. 2C, UEs 1 ... N are shown as connecting to the RAN 120 at locations serviced by different packet data network end-points. The illustration of FIG. 2C is specific to W-CDMA systems and terminology, although it will be appreciated how FIG. 2C could be modified to confirm with a 1x EV-DO system. Accordingly, UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 ... N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2C, UEs 1, 3 and 5 ... N are illustrated as wireless cell-phones, UE 2 is illustrated as a wireless tablet-PC and UE 4 is illustrated as a wired desktop station. However, in other embodiments, it will be appreciated that the wireless communication system 100 can connect to any type of UE, and the examples illustrated in FIG. 2C are not intended to limit the types of UEs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Further, referring to FIG. 2C, the application server 170 is illustrated as including a plurality of media control complexes (MCCs) 1 ... N 170B, and a plurality of regional dispatchers 1 ... N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between UEs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the UEs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
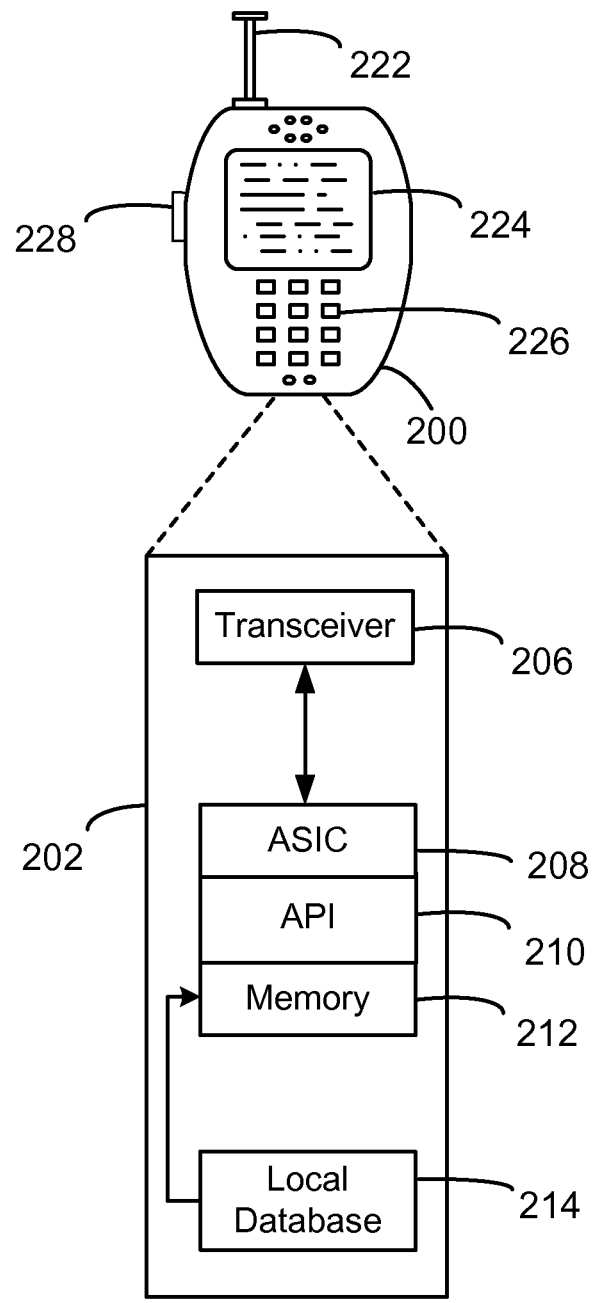
FIG. 3 is an illustration of a user equipment (UE) in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. For example, in W-CDMA, the data communication is typically between the client device 102, Node B(s) 124, and the RNC 122. The RNC 122 can be connected to multiple data networks such as the core network 126, PSTN, the Internet, a virtual private network, a SGSN, a GGSN and the like, thus allowing the UE 102 or 200 access to a broader communication network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4A:
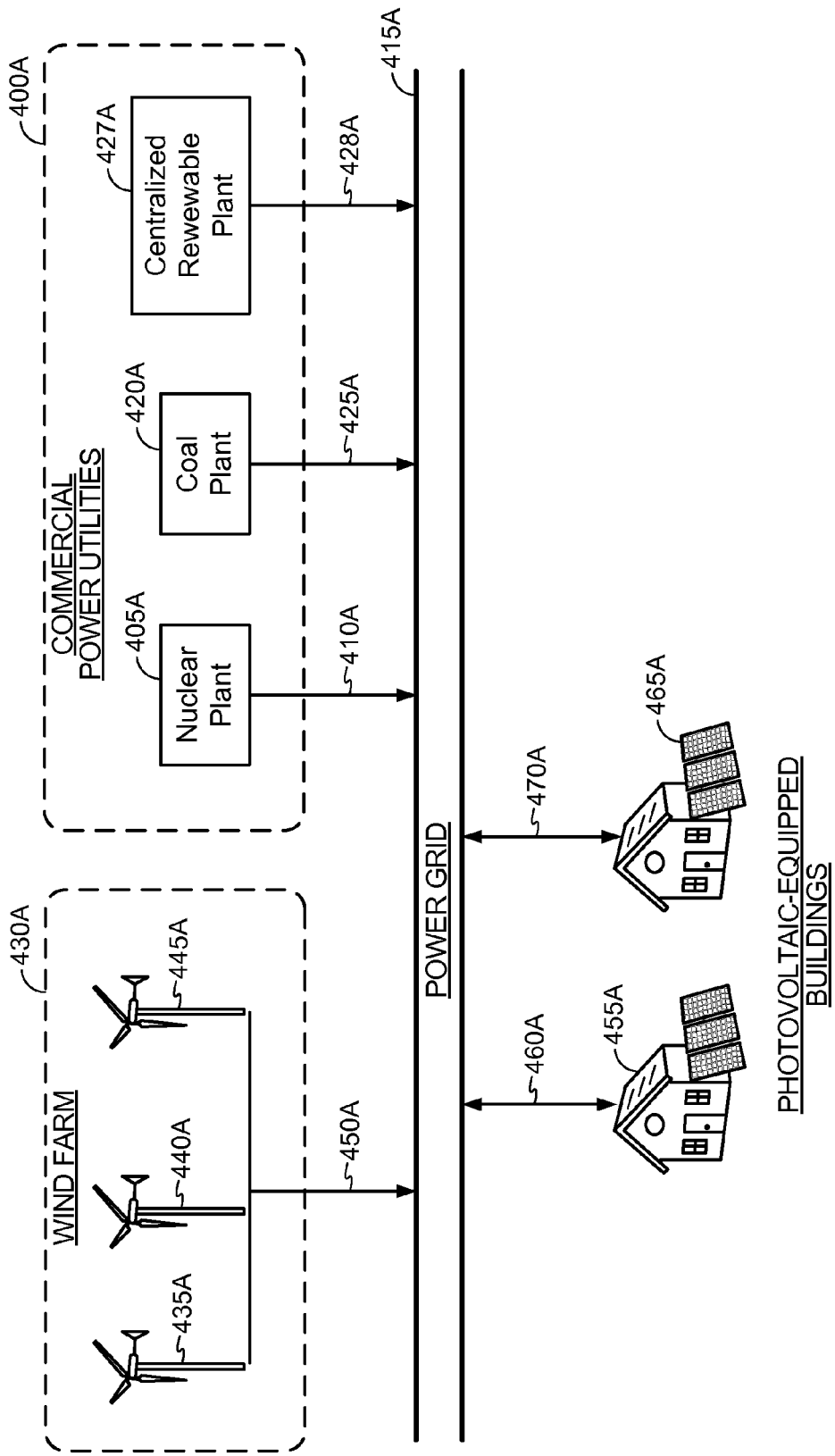
FIG. 4A illustrates a convention power grid system.

FIG. 4A illustrates a convention power grid system. Referring to FIG. 4A, a group of commercial power utilities 400A include a nuclear power plant 405A with a connection 410A to a power grid 415A, a coal power plant 420A with a connection 425A to the power grid 415A, also a centralized renewable plant 427A (e.g., a solar power plant, a commercial wind farm, etc.) with a connection 428A to the power grid 415A. As will be appreciated, the connections 410A, 425A 428A typically constitute high-voltage power lines, and the power grid 415A also includes high-voltage power lines as well as transformers and other power distribution and monitoring equipment. The power grid 415A is typically connected to a large number of loads (e.g., residential loads such as homes, commercial loads such as offices, industrial loads such as factories, etc.) which are not shown in FIG. 4A for convenience of explanation.

Referring to FIG. 4A, the conventional power grid system further includes a wind farm 430A. The wind farm 430A is a distributed power production unit that provides electrical power to the power grid 415A, although typically in smaller amounts than the commercial power utilities 400A. Accordingly, the wind farm 430A includes a plurality of wind turbines 435A, 440A and 445A that collectively have a connection 450A to the power grid 415A. The conventional power grid system further includes a first photovoltaic building 455A that has a connection 460A to the power grid 415A, and also a second photovoltaic building 465A that has a connection 470A to the power grid 415A. The first and second photovoltaic buildings 455A and 465A (e.g., office buildings, residential buildings, etc.) are structures that are equipped with one or more photovoltaic or solar panels. The first and second photovoltaic buildings correspond to distributed power production units that provide electrical power to the power grid 415A, although typically in smaller amounts than the commercial power utilities 400A and/or the wind farm 430A. The operation of the components of the conventional power grid system shown in FIG. 4A will be discussed in more detail below with respect to FIG. 4B.

Figure 4B:
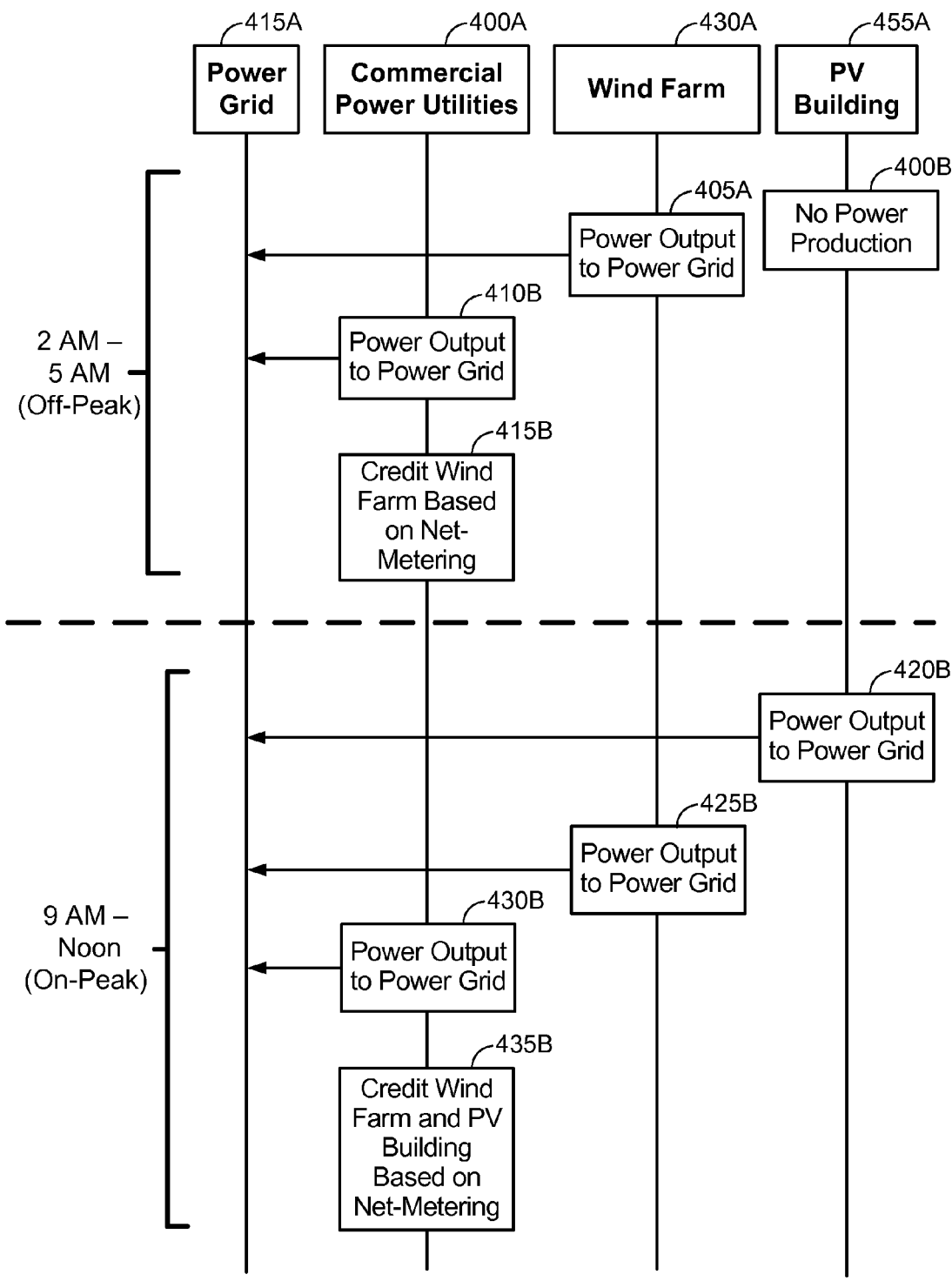
FIG. 4B illustrates a conventional power procedure whereby distributed power production units supply power to a power grid and are credited in accordance with a net metering reward mechanism.

FIG. 4B illustrates a conventional power procedure whereby distributed power production units supply power to the power grid 415A and are credited in accordance with a net metering reward mechanism. It will be appreciated that other conventional power procedures provide no credit at all for units that are net power producers (i.e., not even the relatively low net metering rates).

Referring to FIG. 4B, assume that the power grid system of FIG. 4A is operating in an off-peak time block, such as at night between 2 AM and 5 AM when most customers are asleep and not using high amounts of electrical power. During the off-peak time block, the first photovoltaic building is not producing any electrical power because the sun is down, 400B, the wind farm 430A is producing power and outputting the power to the power grid 415A, 405B, and the commercial power utilities 400A are also producing power and outputting the power to the power grid 415A, 410B. The commercial power utilities 400A meter the amount of power produced by the wind farm 430A during the off-peak time block and credit the wind farm 430A in accordance with a fixed pre-negotiated net metering rate based on the metered amount of power, as is known in the art, 415B.

Referring to FIG. 4B, assume that the power grid system of FIG. 4A is now operating in an on-peak time block, such as in the morning between 9 AM and noon when most customers are awake and are using high amounts of electrical power (e.g., HVAC systems, computers, lights, etc.). During the on-peak time block, the first photovoltaic building is producing electrical power (e.g., because the sun is now up) and outputting the power to the power grid 415A, 420B, the wind farm 430A is still producing power and outputting the power to the power grid 415A, 425B, and the commercial power utilities 400A are also still producing power and outputting the power to the power grid 415A, 430B. The commercial power utilities 400A meter the amount of power produced by the wind farm 430A and the first photovoltaic building 455A during the on-peak time block credit the wind farm 430A and the first photovoltaic building 455A in accordance with the fixed pre-negotiated net metering rate based on the metered amount of power, as is known in the art, 435B.

As will be appreciated by one of ordinary skill in the art, using the fixed pre-negotiated net metering rate to reward power production units for their power ignores the real-time power demands of the power grid system and instead rewards all power equally. Thus, operators of distributed power production units are not incentivized to install power production units that are specially configured to produce power to meet the demands of high-demand or on-peak time blocks. Likewise, the commercial power utilities 400A may find it difficult to meet power demands during on-peak time blocks due to the lack of incentives for the distributed power production units.

Accordingly, embodiments of the invention are directed to tracking real-time power production capacities of groups of distributed power production units. A dynamically negotiated power rate is then determined for each group, if appropriate, based on the group's collective power production capacity and/or location.

Figure 5:
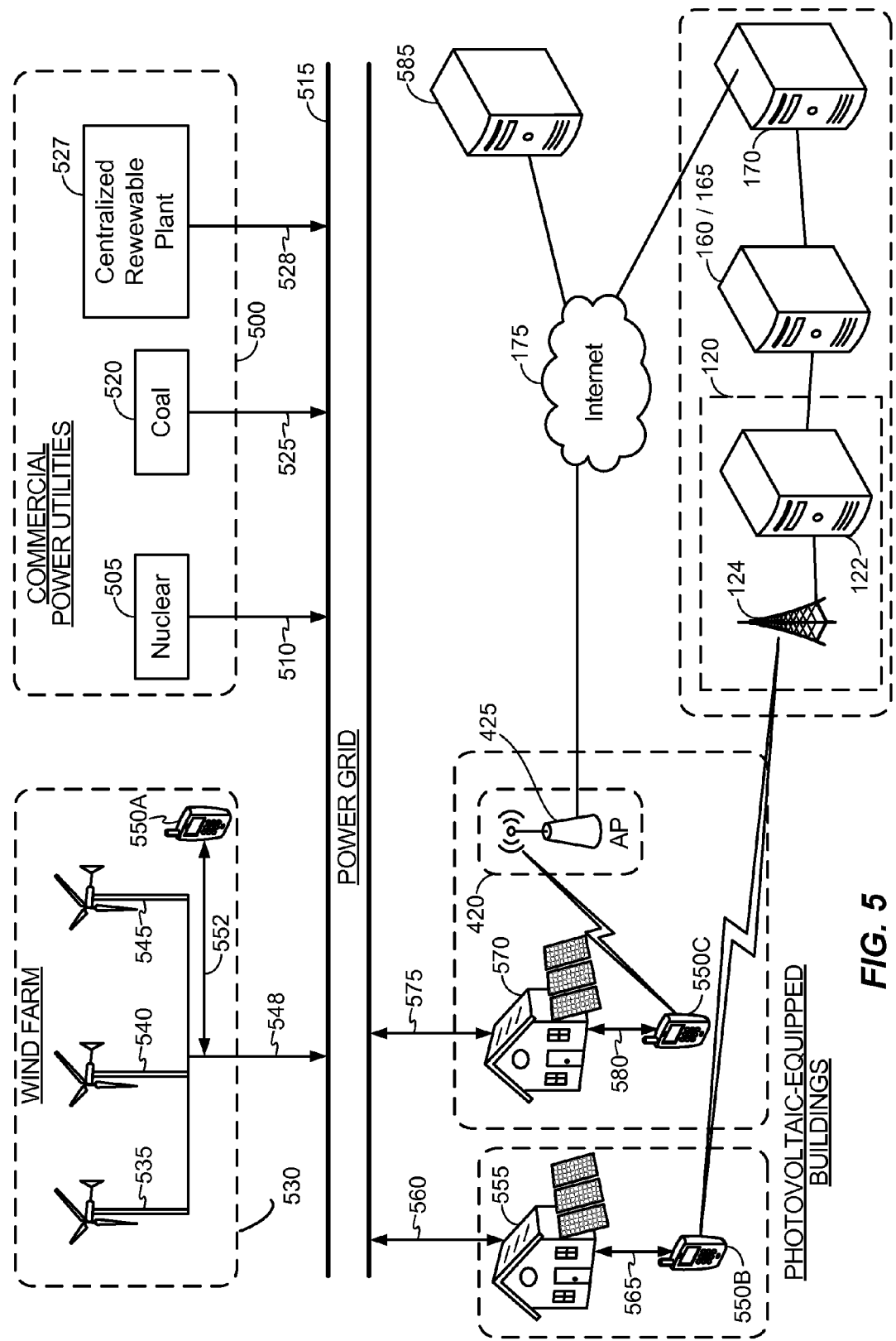
FIG. 5 illustrates a power grid system in accordance with an embodiment of the present invention.

FIG. 5 illustrates a power grid system in accordance with an embodiment of the present invention. Similar to FIG. 4A, the power grid system of FIG. 5 is supplied with power by a group of commercial power utilities 500 that include a nuclear power plant 505 with a connection 510 to a power grid 515, a coal power plant 520 with a connection 525 to the power grid 515 and also a centralized renewable plant 527 (e.g., a solar power plant, a commercial wind farm, etc.) with a connection 528 to the power grid 515. As will be appreciated, the connections 510, 525 and 528 typically constitute high-voltage power lines, and the power grid 515 also includes high-voltage power lines as well as transformers and other power distribution equipment. The power grid 515 is connected to a large number of loads (e.g., homes, offices, etc.) which are not shown in FIG. 5 for convenience of explanation.

Referring to FIG. 5, the power grid system further includes a wind farm 530 that is somewhat similar to the wind farm 430A of FIG. 4A. Accordingly, the wind farm 530 is a distributed power production unit that provides electrical power to the power grid 515, although in smaller amounts than the commercial power utilities 500. The wind farm 530 includes a plurality of wind turbines 535, 540 and 545 that collectively have a connection 548 to the power grid 515.

Referring to FIG. 5, unlike the wind farm 430A of FIG. 4A, the wind farm 530 is further provisioned with a UE 550A. The UE 550A is configured to monitor a location and power production capacity associated with the wind farm 530, and further to report the monitored location and power production capacity to the application server 170. For example, UE 550A may be provisioned with positioning hardware and/or software (e.g., GPS, etc.) by which UE 1 can determine its location. In another example, UE 550A may monitor local beacon signals (e.g., pilot signals from cellular base stations or WLAN APs, radio frequency (RF) fingerprints, etc.) by which the location of UE 550A can be approximated.

UE 550A may further be capable of measuring the power production capacity of the wind farm 530. For example, UE 550A can be connected to a power monitoring system or meter (not shown) that indicates a current amount of electrical power (or voltage/current) being output by the wind farm 530 to the power grid 515. UE 550A may be coupled via a connection 552 to the power monitoring system or meter (not shown) to read power statistics associated with the wind farm 530. The connection 552 may correspond to a physical or wired connection, or alternatively may correspond to a wireless connection (e.g., Bluetooth, etc.). In an example, the power monitoring system or meter (not shown) may include environmental sensors that predict the nature of future power production (e.g., a barometric pressure sensor may detect a pressure-drop indicative of an incoming storm which implies a high-wind prediction in the near-future and thereby a higher power production expectation). Thus, the power monitoring system or meter (not shown) need not be limited to measuring current power production statistics but could also be used to predict future power production expectations.

UE 550A can report the measured power production capacity of the wind farm 530 on a periodic (e.g., once every hour, once every day, etc.) and/or event-triggered basis (e.g., in response to a power production capacity query issued by the application server 170, etc.). The reported power production capacity can either be indicative of a real-time or instantaneous power output level of the wind farm 530, an averaged historical power output level (e.g., the average amount of power output to the power grid 515 over the previous 2 hours, etc.) or alternatively a predicted measure of power expected to be output to the power grid 515 in a future time block (e.g., based on historical averages, environmental statistics and/or weather reports, UE 550A can predict and report an expected power output by the wind farm 530A for the next three hours, etc.). While not shown explicitly in FIG. 5, UE 550A may connect to the application server 170 via a wired or wireless (e.g., WLAN) connection over the Internet 175, or alternatively via the RAN 120 over a cellular communications network. Accordingly, UE 550A's connection to the application server 170 can correspond to any combination of wired and/or wireless communication schemes.

The power grid system of FIG. 5 further includes a first photovoltaic building 555 that has a connection 560 to the power grid 515. Similar to the wind farm 530, the first photovoltaic building 555 is further provisioned with a UE 550B. The UE 550B is configured to monitor a location and power production capacity associated with the first photovoltaic building 555, and further to report the monitored location and power production capacity to the application server 170. UE 550B may be configured similar to UE 550A as discussed above, and UE 550B is coupled to the first photovoltaic building 555 via a connection 565 (e.g., a wireless or wired connection). In FIG. 5, UE 550B is shown as being wirelessly connected to the RAN 120 for connecting to the application server 170. Accordingly, UE 550B can report its monitored location and/or power production capacity information to the application server 170 via the RAN 120, and can also receive queries for the monitored location and/or power production capacity information from the application server 170 over the RAN 120.

The power grid system of FIG. 5 further includes a second photovoltaic building 570 that has a connection 575 to the power grid 515. Similar to the first photovoltaic building 555, the second photovoltaic building 570 is provisioned with a UE 550C. The UE 550C is configured similar to UE 550B as discussed above, and UE 550C is coupled to the second photovoltaic building 570 via a connection 580 (e.g., a wireless or wired connection). In FIG. 5, UE 550C is shown as being wirelessly connected to a Wireless Local Access Network (WLAN) Access Point (AP) 425 in a WLAN 420 for connecting to the application server 170. Accordingly, UE 550C can report its monitored location and/or power production capacity information to the application server 170 via the WLAN 420, and can also receive queries for the monitored location and/or power production capacity information from the application server 170 over the WLAN 420.

Referring to FIG. 5, the power grid system further includes a commercial power utility server 585. The commercial power utility server 585 corresponds to one or more servers operated by, or at least configured to represent, the commercial power utilities 500 or spot market server. As will be described below in more detail, the commercial power utility server 585 is authorized to dynamically negotiate rates with the application server 170 for power produced by one or more power groups within the power grid system of FIG. 5.

Figure 6:
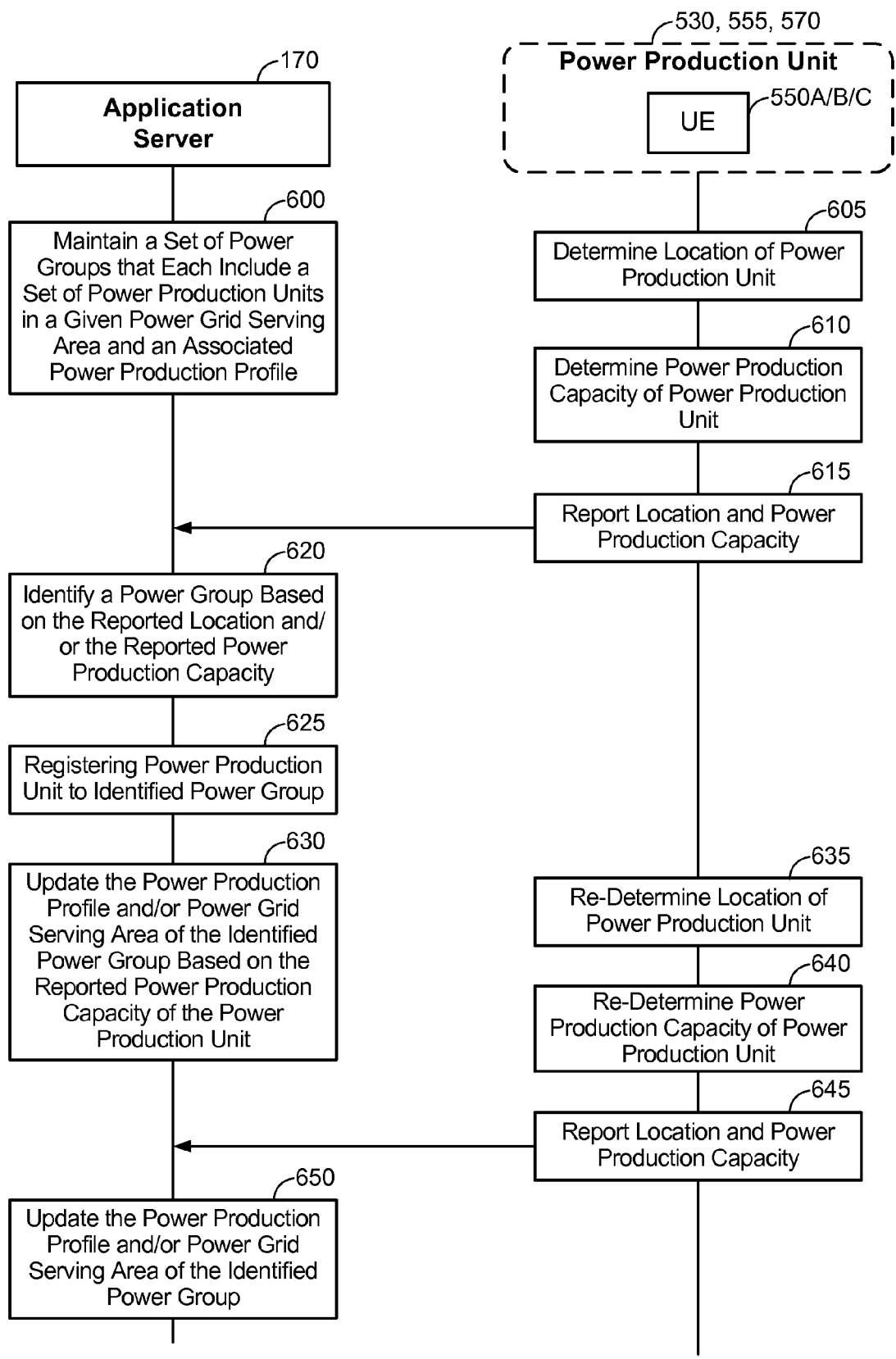
FIG. 6 illustrates a process of forming a power group in accordance with an embodiment of the invention.

FIG. 6 illustrates a process of forming a power group in accordance with an embodiment of the invention.

Referring to FIG. 6, the application server 170 maintains a set of power groups that each include a set of distributed power production units (e.g., the wind farm 530, the photovoltaic buildings 555 and/or 570, etc.) that are configured to supply power to the power grid 515 in a given power grid serving area, 600. Thus, in an example, each of the power groups is populated with power production units that are associated with the same geographical area or power grid serving area (e.g., a two mile geographical radius or geofence, a logical portion or area of the power grid 515, a grid-wide region, etc.). In another example, the geographic association can be relatively loose or broad, such that a given power group could be implemented inclusive of power production units that are distributed throughout a broad region (e.g., a nationwide footprint, etc.). Each of the power groups is further associated with a power production profile, which corresponds to the collective or aggregate amount of power that can be supplied by the power production units of the respective power group in its corresponding power grid serving area.

In an example, the power production profile may be representative of a real-time or instantaneous power production capacity of a given power group, a max total power production capacity of the given power group, or alternatively the power production profile may be representative of a prediction of a power production capacity of the given power group for a future time block (e.g., so that a rate for power produced by the given power group in the future time block can be negotiated by the application server 170 on behalf of the given power group). The remainder of FIG. 6 shows an example of generating or updating a power group for one particular power production unit. It will be appreciated that these operations are representative on how the maintaining operation of 600 can be implemented over time.

Accordingly, after a given power production unit (e.g., wind farm 530, photovoltaic building 555 or 570, etc.) is provisioned with a given UE that is configured for power monitoring and reporting (e.g., UE 550A, UE 550B, UE 550C, etc.), the given UE determines a location of the power production unit, 605. For example, in 605, the given UE can calculate its own position using any well-known positioning mechanism (e.g., GPS, etc.) and can then use the calculated position as the location for the given power production unit.

Referring to FIG. 6, the given UE also determines a power production capacity associated with the given power production unit, 610. For example, in 610, the given UE may access a power monitoring system or meter (not shown) attached to the given power production unit to detect a real-time or instantaneous amount of power being produced by the given power production unit, and can then use the instantaneous power as the power production capacity of the given power production unit. In another example, in 610, the given UE may access a power monitoring system or meter (not shown) attached to the given power production unit to log an average power production of the given power production unit over a period of time (e.g., for each day of the year, for night-time power output, day-time power output, summer vs. winter power output, etc.), and the given UE can then use the averaged power produced by the given power production unit as the power production capacity of the given power production unit for the given period of time. In another example, in 610, the given UE may access a power monitoring system or meter (not shown) attached to the given power production unit to build a power model of the given power production unit across different periods of time (e.g., such that a power production expectation for June $17^{th}$ between 4-6 PM is different than for December $1^{st}$ between 2-4 AM, based on historical performance). In this example, the power model can be used as the determined power production capacity for a target period of time and/or target weather condition(s). In another example, the given UE may predict or forecast its power production capacity for a future time block based on the above-noted power-model and/or predicted or forecasted environmental conditions (e.g., pressure and/or temperature dropping, etc.).

After determining the location of the given power production unit and the power production capacity of the given power production unit, the given power production unit reports the determined location and power production capacity to the application server 170 (e.g., via the RAN 120, via the WLAN 420, etc.) in order to register to a given power group, 615. The application server 170 receives the reported location and production capacity for the given power production unit and attempts to identify an appropriate power group for the given power production unit. For example, the application server 170 can attempt to identify a pre-established power group for the given power production unit that is associated with a power grid serving area overlapping with the reported location of the given power production unit. In another example, the application server 170 can attempt to identify a pre-established power group for the given power production unit that includes other power production units with a similar power production capacity. In another example, the application server 170 can attempt to identify a pre-established power group for the given power production unit that includes other power production units of the same or similar type (e.g., grouping renewable power production units with other renewable power production units, such as solar homes and wind farms together, grouping wind farms with other wind farms or grouping solar homes with other solar homes). In another example, the application server 170 can attempt to identify a pre-established power group for the given power production unit that include a shared or common social relationship (e.g., grouping power production units operated by employees of the same company together, etc.). In another example, the application server 170 can attempt to identify a pre-established power group for the given power production unit that satisfies one or more parameters for an operator of the given power production unit (e.g., a threshold rate or price for power as required by the given power production unit, being a "green" or eco-friendly power group, etc.). In another example, the application server 170 can attempt to identify a pre-established power group for the given power production unit that is associated with two or more of (i) a power grid serving area overlapping with the reported location of the given power production unit, (ii) that includes other power production units with a similar power production capacity, (iii) that includes other power production units of the same or similar type, (iv) that includes a common or shared social relationship with the given power production unit and/or (v) that satisfies one or more parameters for an operator of the given power production unit.

After identifying the power group in 620, the application server 170 registers (or adds) the given power production unit to the identified power group. As will be appreciated by one of ordinary skill in the art, if no pre-existing power group is identified in 620 that matches the location and/or power production capacity of the given power production unit, the application server 170 may generate a new power group and then register the given power production unit to the new power group in 625.

After registering the given power production unit to the identified power group in 625, the application server 170 updates the power production profile and/or the power grid serving area for the identified power group based on the reported production capacity and/or location of the power production unit, 630. For example, the power production profile can be updated in 630 to augment an aggregate amount of power (e.g., instantaneous power, power over time, power in a future time block, etc.) that can be produced by the identified power group. In another example, the power grid serving area for the identified power group can optionally be updated based on the reported location of the given power production unit. For example, if the reported location of the given power production unit is slightly outside of a current power grid serving area defining the identified power group, the power grid serving area for the identified power group can be expanded to include the reported location.

At some later point in time, the given UE re-determines the location of the given power production unit, 635, and also re-determines the power production capacity of the given power production unit, 640. For example, the re-determination operations of 635 and 640 can occur on a periodic basis (e.g., once per day, once per week, etc.) or on an event triggered basis (e.g., in response to a request from an operator of the given UE, in response to a request from the application server 170 via the WLAN 420 or the RAN 120, etc.). The given UE then reports the re-determined location and power production capacity to the application server 170, 645 (e.g., similar to 615). The application server 170 receives the reported location and power production capacity and again updates the power production profile and/or power grid serving area of the identified power group (if necessary), 650 (e.g., similar to 630).

While not shown explicitly in FIG. 6, power production units can also be removed from power groups (e.g., based on requests from the operators of the power production units, based on false power production capacity or location information, etc.) or power groups can be disbanded altogether. In either case, the application server 170 can update the power groups accordingly to reflect any changes to their respective power production profiles and/or power grid serving areas.

Figure 7:
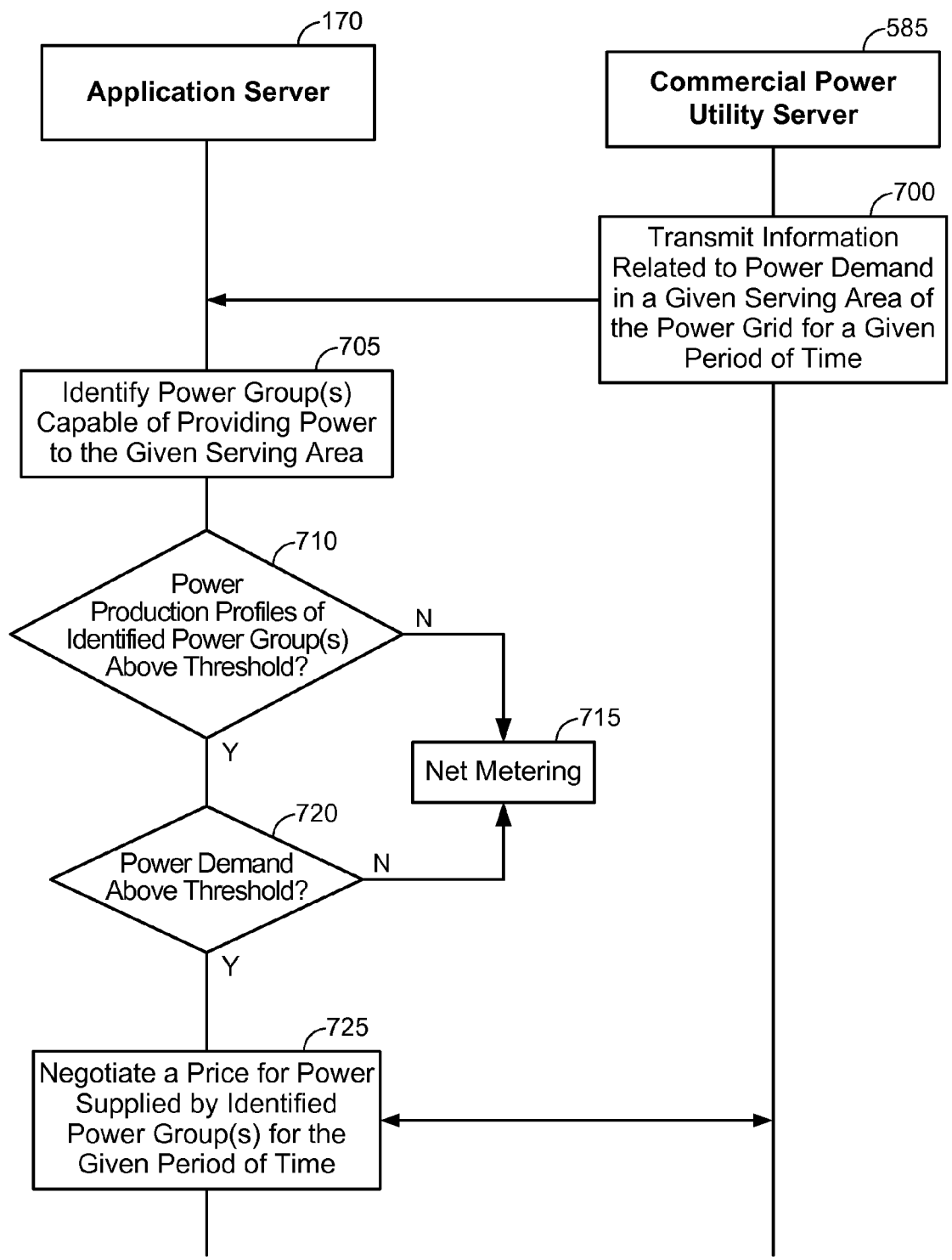
FIG. 7 illustrates a rate negotiation procedure in accordance with an embodiment of the invention.

FIG. 7 illustrates a rate negotiation procedure in accordance with an embodiment of the invention. With respect to FIG. 7, it may be assumed that the process of FIG. 6 has already been executed (or is on-going) such that the application server 170 is provisioned with a set of one or more power groups that each have an associated power production profile and power grid serving area.

Referring to FIG. 7, the commercial power utility server 585 transmits information related to power demand in a given power grid serving area of the power grid 515 for a given period of time, 700. For example, an operator of the commercial power utility server 585 may be concerned about potential brown-outs in upcoming on-peak time blocks during a predicted heat wave. Accordingly, the transmission of 700 may be sent to initiate a negotiation procedure to secure sufficient power for handling the perceived power demand during the predicted heat wave. In another example, the operator of the commercial power utility server 585 may be aware that a commercial power plant is going offline and may wish to secure sufficient power for handling the loss of the commercial power plant during its outage. Thus, the transmission of 700 can be initiated by the operator of the commercial power utility server 585 in an example. Alternatively, the transmission of 700 can be sent in response to a query (not shown) from the application server 170. In this example, the application server 170 can poll the commercial power utility server 585 to check power demand levels of the power grid 515 at different locations and/or times, in other words.

Referring to FIG. 7 at 700, while the examples provided above relate to reasons as to why power demand may be relatively high for a particular period, the power demand may alternatively be configured to reflect a relatively low demand for power (e.g., off-peak time block, etc.) or even a demand for less power altogether. For example, locations in proximity to source of a power outage (e.g., a downed power line, etc.) may attract electrical technicians (or line crew) to repair the damage. Simply flooding these downed power lines with electricity during the repair process may be dangerous to the line crew. Accordingly, power demand for the power grid serving area that would enter into in proximity to the repair area may be dis-incentivized even though overall power demand for the power grid 515 is increased during the outage period. Accordingly, the power demand can be relatively local in nature and can vary in different portions of the power grid even in the same time block. In such instances, the power production units in proximity to the downed power lines may be incentivized to not provide power, for example, by getting paid little to nothing (or even penalized) for power production and/or by getting paid to shut off their power that is input into the power grid 515.

Referring to FIG. 7, the application server 170 receives the power demand information and identifies one or more power group(s) configured to serve power grid serving area(s) that overlap at least in part with the given power grid serving area associated with the power demand, 705. The application server 170 then identifies whether the power production profile(s) of the identified power group(s) over the given period of time are above a power production threshold, 710. For example, the commercial power utility server 585 may only want to negotiate with power groups that can satisfy its power demand completely, in which case the power production threshold of 710 is equal to the indicated power demand. Alternatively, the commercial power utility 585 may simply want to secure whatever power it can, in which case the power production threshold of 710 may be lower than the indicated power demand (or zero).

If the application server 170 determines that the power production profile(s) of the identified power group(s) over the given period of time are not above the power production threshold in 710, the application server 170 stops negotiating and the power production units in the identified power group(s) revert to the net metering reward mechanism and/or a fixed pre-negotiated net metering rate, 715. Alternatively, if the application server 170 determines that the power production profile(s) of the identified power group(s) over the given period of time are above the power production threshold in 710, the application server 170 whether the indicated power demand itself is above a power demand threshold, 720. For example, if the indicated power demand is relatively low, the commercial power utility server 585 may not be willing to pay more than the fixed pre-negotiated net metering rate, in which case negotiation will not actually benefit the identified power group(s). If the application server 170 determines that the indicated power demand is not above the power demand threshold in 720, the application server 170 stops negotiating and the power production units in the identified power group(s) revert to the net metering reward mechanism based on the fixed pre-negotiated net metering rate, 715.

In another embodiment of the invention, the application server 170 need not revert to the net metering reward mechanism in 715. Instead, the application server 170 can attempt to engage in spot markets of energy and negotiate to sell power to other geographic areas utilizing transmission or distribution lines to move energy to a region that demand values the energy with a greater price. Alternatively, the concept of trading energy with a local entity for energy in another geographic region could also be significant resulting in less transmission and distribution losses caused from moving energy. In a further example, instead of defaulting to the net reward mechanism in 715, the application server 170 can instead attempt to sell the energy associated with the identified power group(s) directly to a target residential entity (e.g., a homeowner's association representing a particular condo building or community, etc.), a target industrial entity (e.g., a particular factory, etc.) or a target commercial entity (e.g., a shopping mall, an office building, etc.). Accordingly, even if the commercial power utilities are not willing to pay a premium to energy supplied by a particular power group, the application server 170 can attempt to sell the energy produced by the power group via alternate channels in an embodiment.

Alternatively, if the application server 170 determines that the indicated power demand is above the power demand threshold in 720, the application server 170 negotiates with the commercial power utility server 585 to determine a dynamic rate to be awarded to the power production units in the identified power group(s) over the given period of time, 725. The negotiation of 725 can include a series of rate offers, counter-offers, and so on, until an agreement is reached. Alternatively, a pre-agreed upon rate computation algorithm can be executed by the application server 170 and/or the commercial power utility server 585 to calculate the negotiated price.

Figure 8:
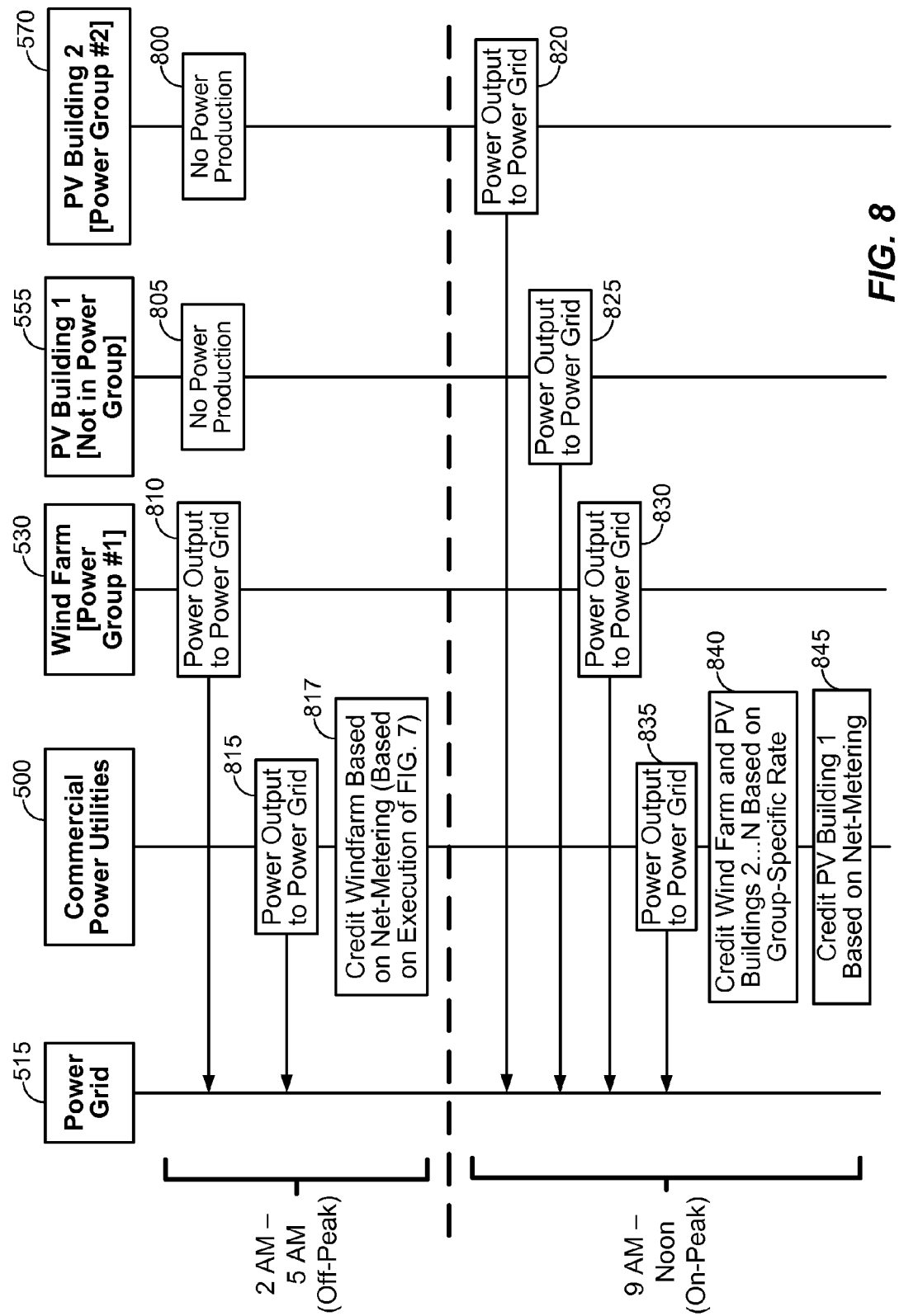
FIG. 8 illustrates a power procedure whereby power production units supply power to a power grid and are credited in accordance with a rate based on execution of the negotiation procedure of FIG. 7.

FIG. 8 illustrates a power procedure whereby power production units supply power to the power grid 515 and are credited in accordance with a rate based on execution of the negotiation procedure of FIG. 7.

Referring to FIG. 8, assume that the power grid system of FIG. 5 is operating in an off-peak time block, such as at night between 2 AM and 5 AM when most customers are asleep and not using high amounts of electrical power (e.g., HVAC systems are idle, lights are off, computers are off, etc.). Further assume that the process of FIG. 7 has executed for a first power group including the wind farm 530, resulting in a net metering rate for the first power group during the off-peak time block in 715 (e.g., based on insufficient power demand in a power grid serving area of the first power group, insufficient power production capacity of the first power group, etc.). Further assume that the first photovoltaic building 555 is not part of any power group, and will thereby always use the fixed pre-negotiated net metering rate by default. Further assume that the process of FIG. 7 has executed for a second power group including the second photovoltaic building 570, but that the second photovoltaic building 570 is not capable of generating any power during the off-peak time block. Thus, a rate may have been negotiated on behalf of the second photovoltaic building 570, but the building itself is not generating power and will not be able to sell its power at the negotiated rate in any case.

Accordingly, during the off-peak time block, the first and second photovoltaic buildings 555 and 570 are not producing any electrical power because the sun is down, 800 and 805, the wind farm 530 is producing power and outputting the power to the power grid 515, 810, and the commercial power utilities 500 are also producing power and outputting the power to the power grid 515, 815. The commercial power utilities 500 meter the amount of power produced by the wind farm 530 during the off-peak time block and credit the wind farm 530 in accordance with the net metering rate due to the previous execution of the process of FIG. 7, 815 (e.g., because the power demand during the off-peak time block is relatively low).

Referring to FIG. 8, assume that the power grid system of FIG. 5 is now operating in an on-peak time block, such as in the morning between 9 AM and noon when most customers are awake and are using high amounts of electrical power (e.g., HVAC systems, computers, lights, etc.). Further assume that the process of FIG. 7 has executed for the first power group, resulting in a first group-specific rate for the first power group during the on-peak time block in 725 (e.g., based on high power demand in a power grid serving area of the first power group, etc.). Further assume that the process of FIG. 7 has also executed for the second power group, resulting in a second group-specific rate for the first power group during the on-peak time block in 725 (e.g., based on high power demand in a power grid serving area of the second power group, etc.).

Accordingly, during the on-peak time block, the first and second photovoltaic buildings 555 and 570 are both producing electrical power (e.g., because the sun is now up) and outputting the power to the power grid, 820 and 825, the wind farm 530 is still producing power and outputting the power to the power grid 515, 830, and the commercial power utilities 500 are also still producing power and outputting the power to the power grid 515, 835. The commercial power utilities 500 meter the amount of power produced by the wind farm 530 and the second photovoltaic building 570 during the on-peak time block, and credit the wind farm 530 and the second photovoltaic building 570 with the first and second group-specific rates for the first and second power groups, respectively, 840.

Also, the commercial power utilities 500 meter the amount of power produced by the first photovoltaic building 555 during the on-peak time block and credit the first photovoltaic building 555 in accordance with the fixed pre-negotiated net metering rate based on the metered amount of power, 845, because the first photovoltaic building 555 is not part of a power group that has a negotiated group-rate for the on-peak time block.

While FIG. 8 is described in an example scenario whereby execution of the process of FIG. 7 results in a net metering rate at 815 during the off-peak time block, it will be appreciated that a negotiated rate may be implemented for off-peak time blocks in other embodiments of the invention.

As will be appreciated, pooling power production resources into groups increases the bargaining power of individual, distributed power production units so time-specific and/or location-specific pricing can be dynamically allocated based on power demands throughout the power grid system. Further, the commercial power utilities 500 also benefit because there is a monetary incentive for operators of distributed power production units to increase power production capacity at times and/or locations where power demand is expected to be high. Also, through the prospect of revenue instead of mere utility bill reductions, operators of distributed power production units are incentivized to overproduce or install larger systems than they otherwise may have installed if their compensation were limited to net metering.

Further, in addition to renewable distributed power production, distributed fuel-based generators could also be implemented as a distributed power production unit in other embodiments of the invention. For example, during on-peak time blocks, an operator could turn on a fossil-fuel based power generator and add power to the power grid 515.

In a further embodiment, power storage systems can be connected to the power grid system 515 and configured to store energy during off-peak time blocks and then "produce" energy during on-peak time blocks (i.e., where producing in context with a power storage system implies that stored power is re-introduced into the power grid 515). Thus, distributed power "production" units are not limited to power production that originates from the distributed power production units themselves.

Further, it will be appreciated that any of the above-noted distributed power production units may also be classified as a power consumption unit. Based upon the power consumption requirements of a particular power production unit, it may sometimes make more fiscal sense for the power production unit to use consume its power instead of supplying power to the grid. The application server 170 can factor the power consumption requirements of the power production units into account with respect to their power production profiles (e.g., so that the application server 170 only commits energy that a particular power production unit can afford to output while permitting the power production unit to "keep" a certain amount of its own power for its own use regardless of whether a demand response event has been triggered).

Further, it will be appreciated that encouraging distributed renewable power production units to be installed throughout a regional area (e.g., instead of being concentrated in one particular portion of the regional area) can improve power stability across the power grid 515 due to less overall system intermittency and with the predictive nature of using sensors, feedback related to system impact as weather conditions change can be accumulated and evaluated.

In another embodiment, while a given power group is supplying power to a power grid (e.g., as in 810, 820 and/or 830 of FIG. 8), the application server 170 (or some other server) can predict a group-wide power production disruption. For example, in the case of a solar or photovoltaic power group, the application server 170 may become aware of a passing cloud bank in proximity to the power group, a solar eclipse, etc., so that power production will temporarily be expected to be reduced or disabled across the power group. In another example, in the case of a windfarm, the application server 170 may become aware of low-wind or gusty weather prediction indicative of a period of low or unstable power output.

Upon predicting the temporary power production disruption for the power group, the application server 170 preemptively sends a power control command to each distributed power unit in the power group to instruct the distributed power units to begin storing power in anticipation of the temporary power production disruption. Thus, when the temporary power production disruption occurs, the distributed power production units are able to leverage the stored power to "condition" the power being output to the power grid (i.e., so that the power is conditioned for operation by a local inverter). Conventionally, if power production becomes low or unstable, the whole power output can become unstable and unusable. Preemptively saving up power in anticipation of power disruptions can reduce such occurrences via power conditioning. This embodiment is discussed in more detail below with respect to FIGS. 9 through 10F.

Figure 9:
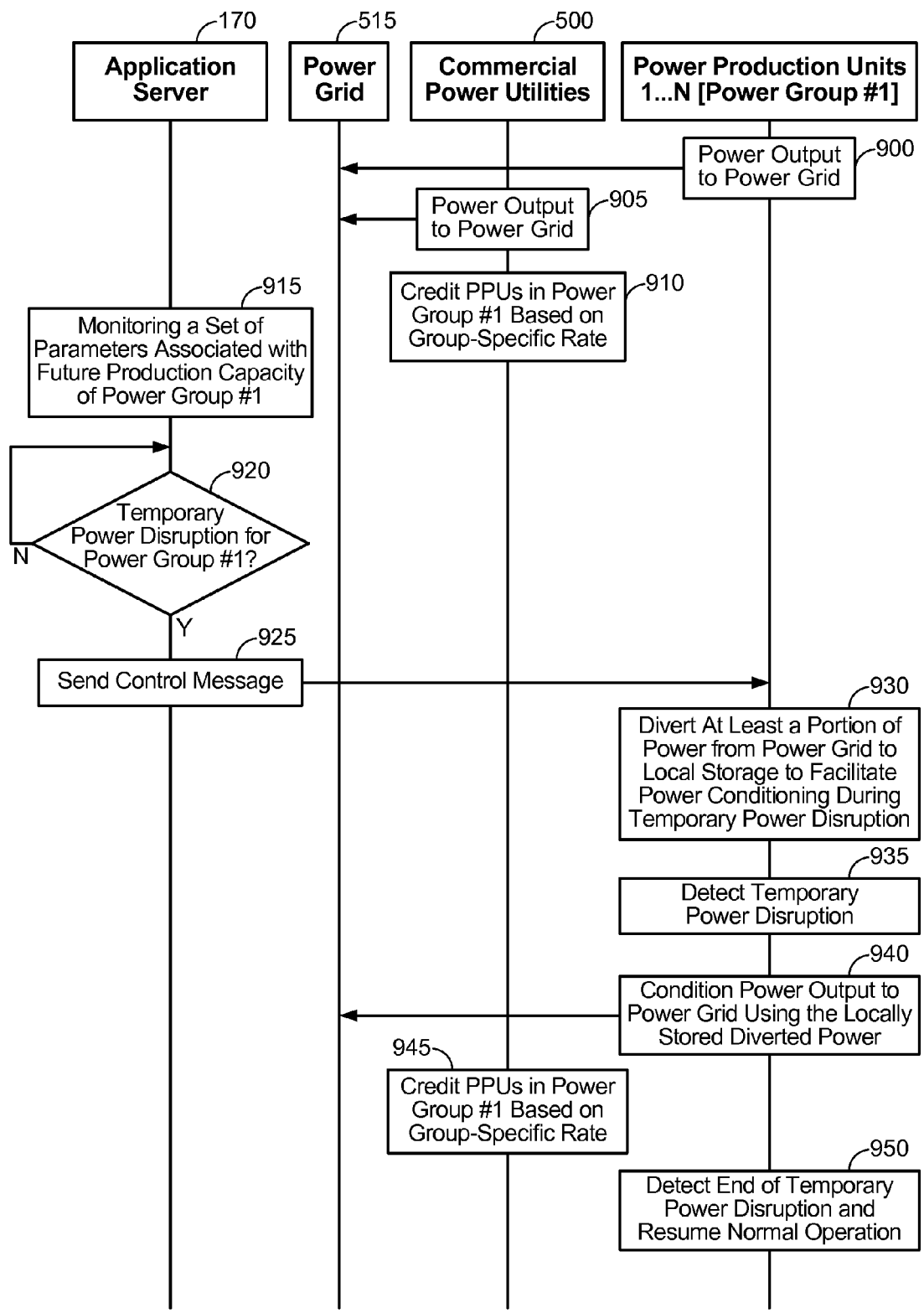
FIG. 9 illustrates another power procedure whereby power production units supply power to a power grid and are credited in accordance with a rate based on execution of the negotiation procedure of FIG. 7 and further whereby a temporary power disruption for the power group is communicated to the power group in accordance with an embodiment of the invention.

Referring to FIG. 9, assume that the process of FIG. 7 has executed for a given power group including a plurality of power production units 1 . . . N, resulting in a group-specific negotiated rate for the plurality of power production units 1 . . . N during a given time period. Accordingly, during the given period of time, the plurality of power production units 1 . . . N of the given power group are producing power and outputting the power to the power grid 515, 900, and the commercial power utilities 500 are also producing power and outputting the power to the power grid 515, 905. The commercial power utilities 500 meter the amount of power produced by the given power group during the given period of time and credit the plurality of power production units 1 . . . N in accordance with the group-specific negotiated rate based on the previous execution of the process of FIG. 7, 910.

While the power production units 1 . . . N are supplying power to the power grid 515 and being credited accordingly (900 and 910), the application server 170 (or some other server) is monitoring a set of parameters associated with the future power production capacity of the given power group, 915. For example, the monitored set of parameters can include local weather conditions associated with a geographic area in proximity to the physical locations of the plurality of power production units 1 . . . N (e.g., local wind conditions, local cloud movement, etc.). The set of parameters can be monitored by the application server 170 based upon feedback from the individual power production units within the given power group, based upon feedback from power production units in other nearby power groups or via one or more third party sources (e.g., weather satellites, localized weather sensors, etc.). Additional examples of types of parameters that can be monitored by the server to detect temporary power disruptions include irregular voltage, phase or current in the power grid 515, insight into misbehaving equipment on a line of the power grid 515 that could result in a failure (such as falling out of a given specification for normal operation), or an unexpected load on the power grid 515 that could result in power loss. Additionally, when service crews are dispatched to repair the power grid 515, the service crews may temporarily disrupt power flow, so advanced notice of field work in the area, or through a smart grid application, can be used to predict the temporary power disruption. Further, if a consumer is on a pre-pay or post-pay but limited energy use plan, then gaining insight into energy costs based on increases or decreases in energy pricing could imply a potential disruption to power.

Based on the monitored set of parameters from 915, the application server 170 determines whether the given power group is expected to experience a temporary power disruption within the given period of time when the commercial power utilities 500 are relying upon the given power group for power production to the power grid 515, 920. In an example, the determination of 920 can be based upon an expectation that each power production unit in the given power group is expected to experience the temporary power disruption, or alternatively that a threshold number or percentage of power production units within the given power group are expected to experience the temporary power disruption. If the application server 170 determines that no temporary power disruption is expected for the given power group based on the monitored set of parameters in 920, the process returns to 915 and the application server 170 continues to monitor the set of parameters. Alternatively, if the application server 170 determines that a temporary power disruption is expected for the given power group based on the monitored set of parameters in 920, the application server 170 sends a control message to the given power group, 925. The control message sent at 925 can be sent via one or more APs 425, one or more Node Bs 124, and so on (e.g., see FIG. 5).

Referring to 925 of FIG. 9, the control message is configured to prompt the power production units 1 . . . N within the given power group to store power prior to the predicted temporary power disruption, and the control message can be configured in a number of ways. For example, the control message can convey the type of temporary power disruption (e.g., cloud, wind gust, etc.), the duration of the temporary power disruption (e.g., 80 seconds, 4 minutes, 4 hours, etc.), the time at which the temporary power disruption is expected to begin and the time at which the temporary power disruption is expected to end. The power production units 1 . . . N can then leverage this information to determine how much power to store prior to the time at which the temporary power disruption is expected to begin. Alternatively, the control message can explicitly instruct the power production units 1 . . . N to reduce their power output to the power grid 515 and store power without indicating the reason for doing so. Alternatively, the control message can recommend a threshold level of power for power conditioning to be stored prior to a specified time corresponding to when the temporary power disruption is expected to occur (where the threshold level of power can vary from power production unit to power production unit based on their respective power production capacities). Accordingly, there are numerous ways that the control message of 925 can be implemented. In any of the above-noted implementations, the control message functions to prompt the power production units 1 . . . N to store at least some additional power for power conditioning than would be stored if the control message were not transmitted.

Referring to FIG. 9, power production units 1 . . . N of the given power group receive the control message and begin diverting at least a portion of their respective power production from power grid output to local storage in order to facilitate power conditioning during the predicted temporary power disruption, 930. In an example, the power diversion (or power output reduction) that occurs at 930 can begin immediately upon receipt of the control message at 925, or alternatively can begin at a scheduled time after receipt of the control message at 925 (e.g., 35 seconds prior to when the temporary power disruption is expected to begin, 5 minutes after receipt of the control message, etc.). In a further example, the power diversion operation of 930 can trigger the power production units 1 . . . N to store a threshold level of local power. In this embodiment, after the threshold level of power is stored locally, the power production units 1 . . . N can resume normal power output to the power grid 515 because a level of power deemed sufficient for power conditioning during the temporary power disruption has been reserved. Also, the power diversion operation of 930 can be full or partial. For example, prior to 930, a given power production unit in the given power group may supply 100% of its power to the power grid 515. During the power diversion operation of 930, the given power production unit may supply 60% of its power to the power grid 515, with the remaining 40% of its power being stored locally. When a threshold level of power is stored, the given power production unit can resume 100% power output (except for periodic refreshing of the threshold level of the local power storage) until the temporary power disruption occurs.

Referring to FIG. 9, at some point after the control message is received at 925, the power production units 1 . . . N of the given power group detect the temporary power disruption, 935. For example, the temporary power disruption may be detected by a relatively sudden reduction to the power production at the respective power production units 1 . . . N. In response to the detection of the temporary power disruption at 935, the power production units 1 . . . N condition their power output to the power grid 515 using the locally stored, diverted power from 930, 940. The commercial power utilities 500 continue to meter the amount of power produced by the given power group and credit the plurality of power production units 1 . . . N in accordance with the group-specific negotiated rate based on the previous execution of the process of FIG. 7 during the temporary power disruption, 945. At some later point in time, the power production units 1 . . . N detect the end of the temporary power disruption and resume normal operation (i.e., without power conditioning and without reliance upon a reserve of stored local power for use in power conditioning), 950.

In a further example, while not shown explicitly in FIG. 9, the application server 170 can aggregate power statistics associated with the power production of the power production units 1 . . . N. For example, these statistics could be compared against actual measured power production by power production unit (or cell type) to specifications for normal operation and the results of this comparison can indicate if the power production unit is working as expected, and if not, the application server 170 could compare the performance of these power production units to others with comparable systems in the area to see if as the abnormal performance is a result of environmental conditions or if a particular power production unit is failing or otherwise not achieving the results it should. Alternatively, these statistics could be aggregated and used by the application server 170 to more accurately predict potential power availability within a region or stored as yet another reference on power production in a particular region given certain environmental conditions. Further, these statistics could be aggregated and used by the application server 170 with the manufacturer of the respective power production units to help them observe how the power production units are working in the field and how they are fairing over time. The types of power statistics that could be aggregated include but are not limited to efficiency, peak power output, average power output, stability of voltage, current, phase, and so on. This information could be thus aggregated and then leveraged in real-time to control operation of the power grid 515, or the information could be aggregated and leverages for longer periods of time such as day to day statistics of expected performance. The aggregated data could also be shared with manufacturers or $3^{rd}$ parties to show how well systems compare expectations or are fairing in time.

FIGS. 10A through 10F illustrate an example implementation of a portion of the process of FIG. 9. In particular, FIGS. 10A through 10F illustrate an example implementation of FIG. 9 whereby the temporary power disruption corresponds to temporary cloud cover in proximity to the given power group. For example purposes, the given power group in FIGS. 10A through 10F are shown as connected to the application server 170 via a single Node B 124. It will be appreciated that alternative connection mechanisms are possible in other embodiments of the invention (e.g., AP 125, more than one Node B 124, etc.).

Figure 10A:
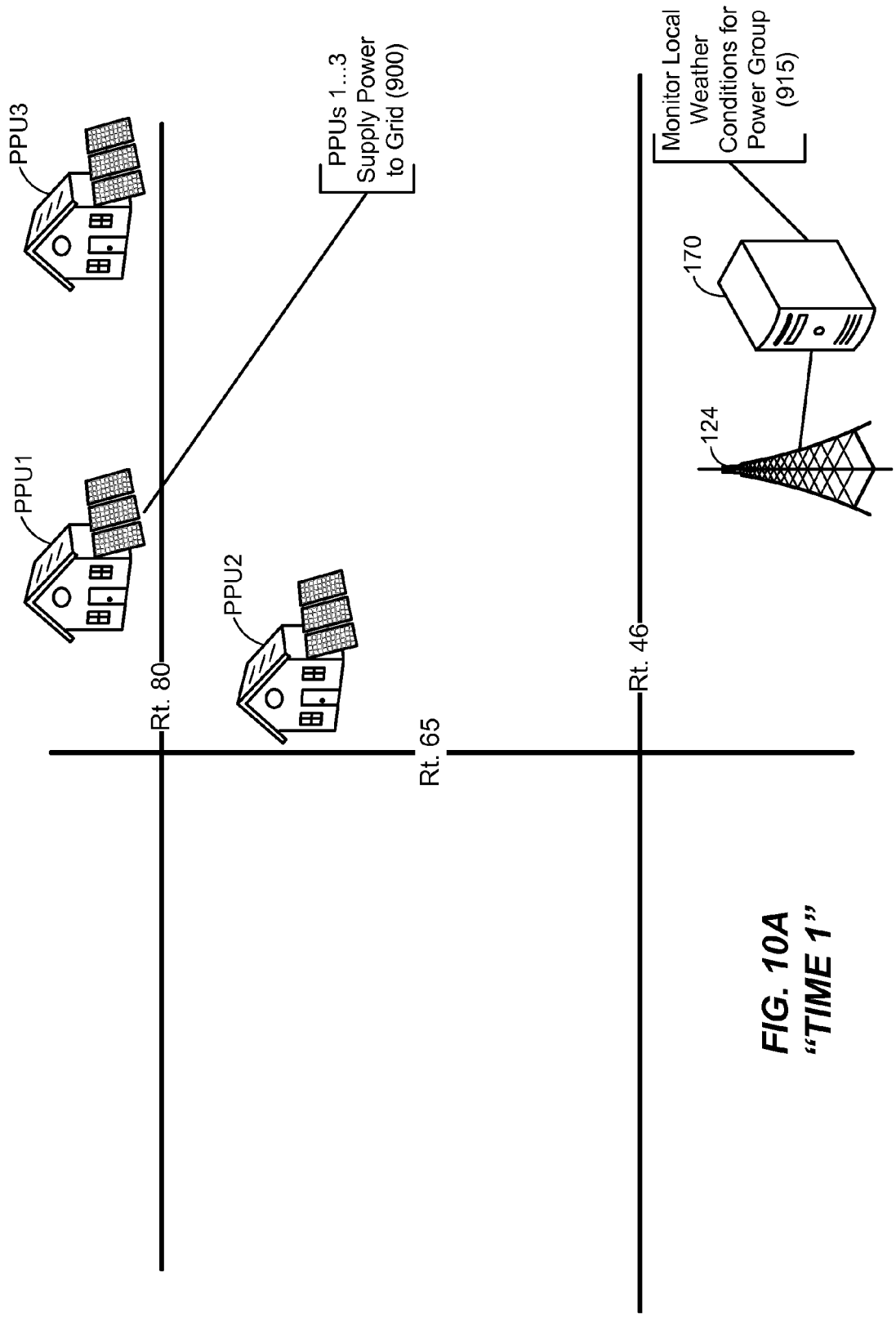
Figure 10B:
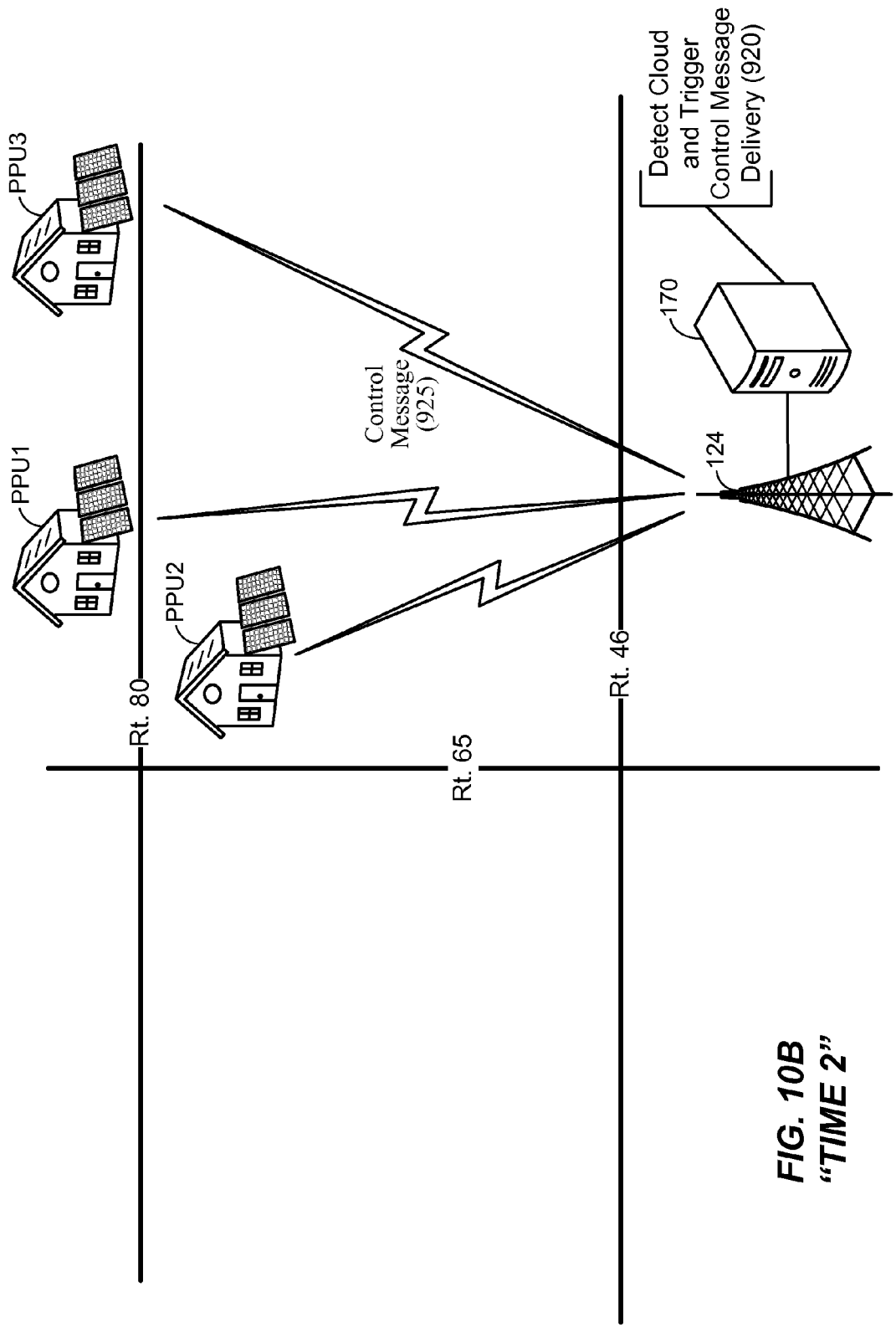

Referring to FIG. 10A, at time 1, power production units 1 . . . 3 are supplying power to the power grid 515 (e.g., as in 900 of FIG. 9) while the application server 170 monitors local weather conditions for the given power group (e.g., as in 915 of FIG. 9). Referring to FIG. 10B, at time 2, the monitoring of the application server 170 results in a prediction that a cloud will temporarily disrupt power production of the given power group between times 4 and 5 (e.g., as in 920 of FIG. 9). Accordingly, the application server 170 transmits a control message via the Node B 124 to prompt the power production units 1 . . . 3 of the given power group to store power in anticipation of the incoming cloud disruption (e.g., as in 925 of FIG. 9).

Figure 10C:
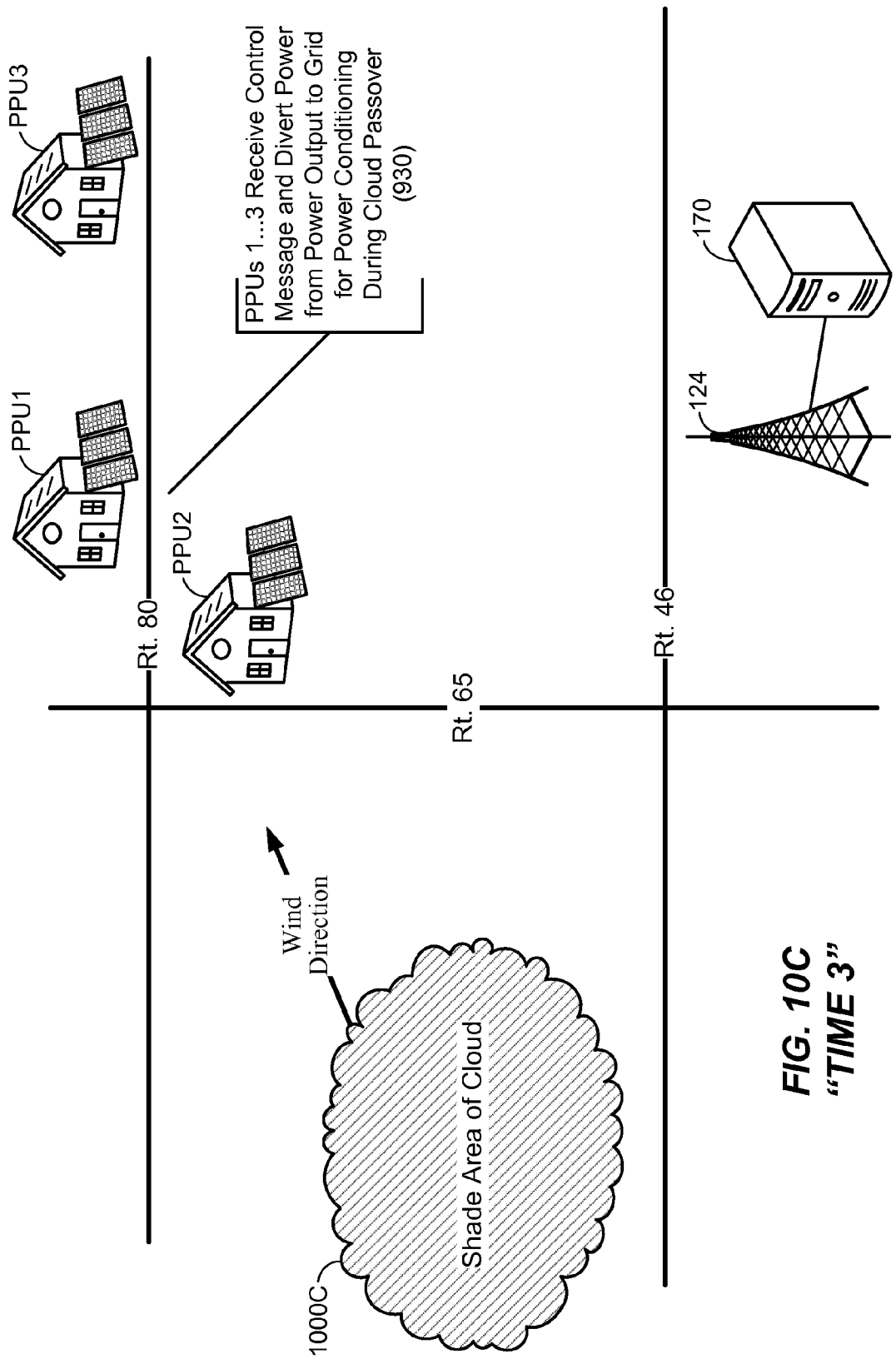

Referring to FIG. 10C, at time 3, a shaded area 1000C caused by the predicted cloud approaches the power production units 1 . . . 3 of the given power group. Prior to being impacted by the shaded area 1000C, the power production units 1 . . . 3 receive the control message from the application server 170 and begin to divert all or part of the power output from grid-delivery to local storage for use in power conditioning during the upcoming shade period (e.g., as in 930 of FIG. 9). Referring to FIG. 10D, at time 4, a shaded area 1000D caused by the predicted cloud covers power production units 1 and 2 and disrupted their power production. At time 4, the shaded area 1000D does not impact power production unit 3. Accordingly, the power production units 1 and 2 detect the disruption to their power production caused by the shaded area 1000D and condition the power being output to the power grid 515 using the stored power (e.g., as in 935 and 940). Because the power production unit 3 is not yet affected by the cloud at time 4, the power production unit 3 continues to divert power from its power output to the grid to local storage (e.g., as in 930 of FIG. 9).

Figure 10E:
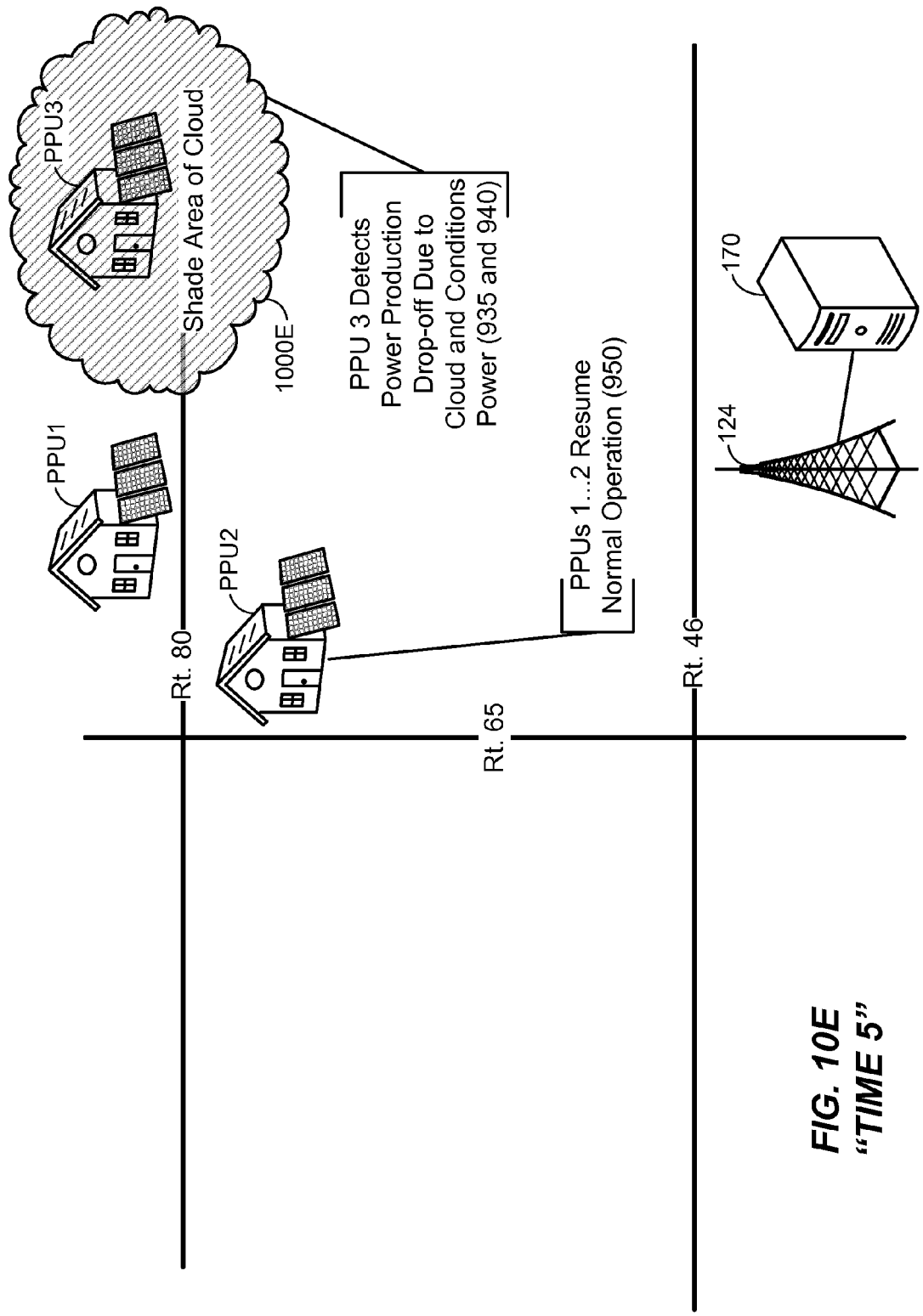
Figure 10F:
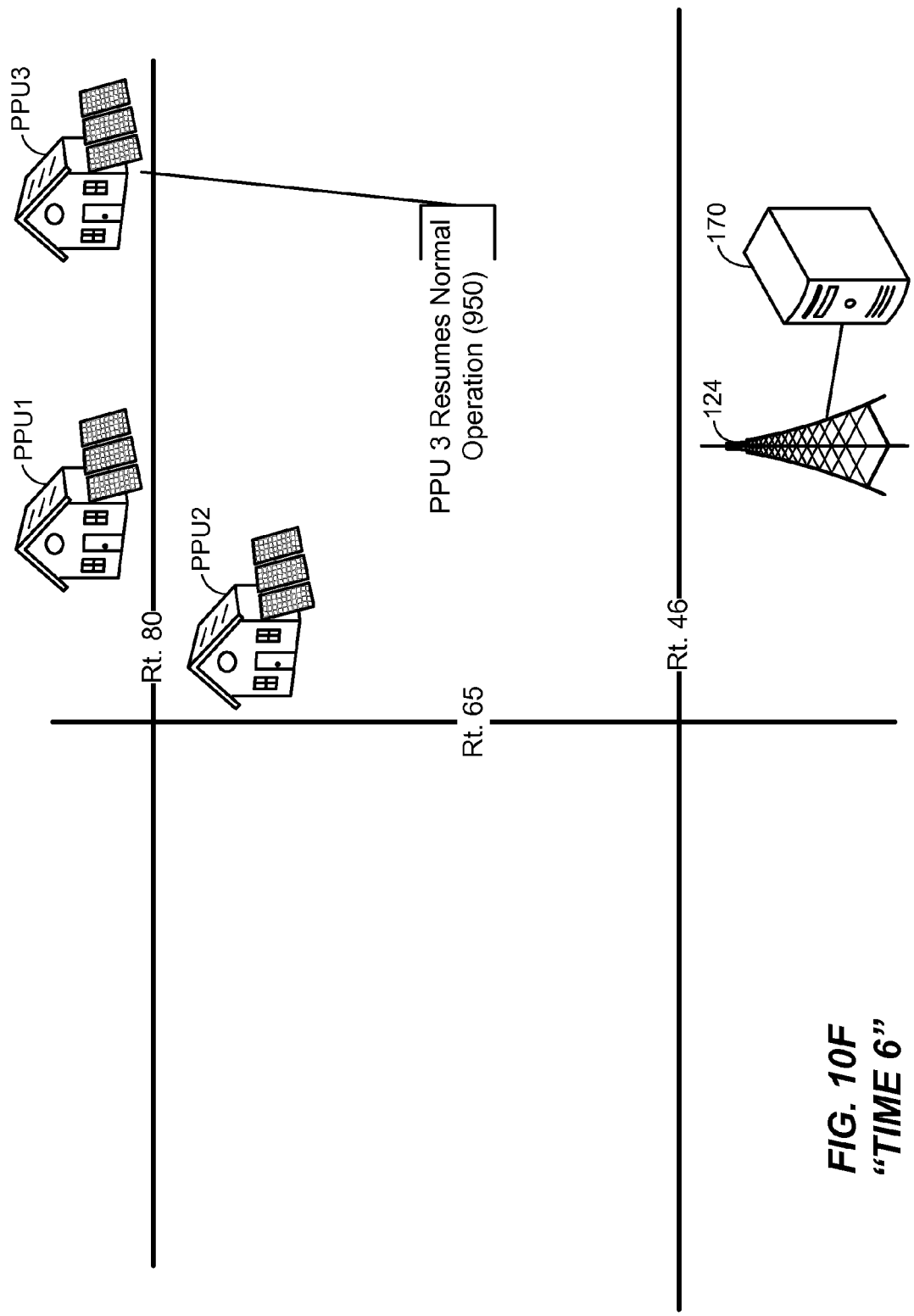

Referring to FIG. 10E, at time 5, a shaded area 1000E now covers the power production unit 3 and the power production units 1 and 2 are no longer shaded. Accordingly, the power production units 1 and 2 resume normal operation (e.g., as in 950 of FIG. 9). The power production unit 3 detects the disruption to its power production caused by the shaded area 1000E and conditions its power being output to the power grid 515 using the stored power (e.g., as in 935 and 940). Referring to FIG. 10F, at time 6, the cloud has left the area and is no longer causing a shaded area to impact any of the power production units 1 . . . 3. Accordingly, the power production unit 3 can also resume normal operation (e.g., as in 950 of FIG. 9). As will be appreciated, a moving cloud is only one example trigger for a temporary power disruption. Accordingly, FIGS. 10A through 10F are intended to clarify (but not limit) the operation of FIG. 9.

Figure 11:
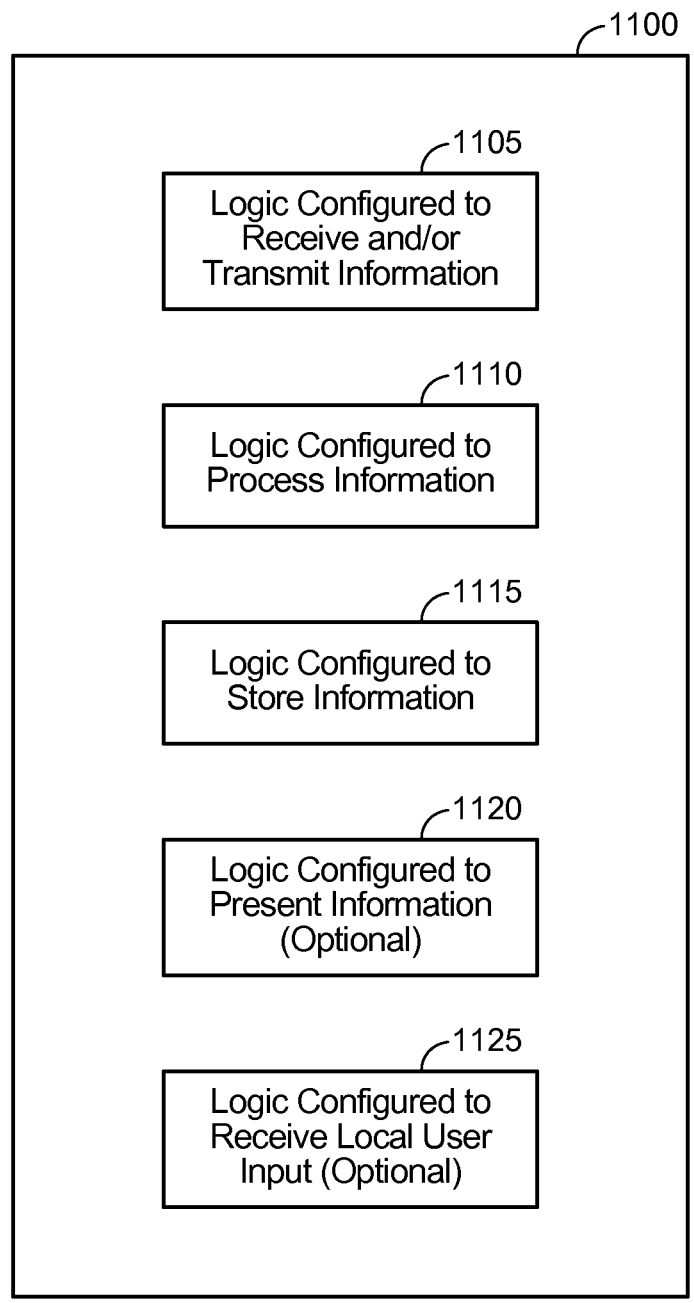
FIG. 11 illustrates a communication device that includes logic configured to perform functionality.

FIG. 11 illustrates a communication device 1100 that includes logic configured to perform functionality. The communication device 1100 can correspond to any of the above-noted communication devices, including but not limited to UEs 102, 108, 110, 112 or 200, Node Bs or base stations 120, the RNC or base station controller 122, a packet data network end-point (e.g., SGSN 160, GGSN 165, etc.), any of the servers 170 through 186, etc. Thus, communication device 1100 can correspond to any electronic device that is configured to communicate with (or facilitate communication with) one or more other entities over a network.

Referring to FIG. 11, the communication device 1100 includes logic configured to receive and/or transmit information 1105. In an example, if the communication device 1100 corresponds to a wireless communications device (e.g., UE 200, Node B 124, etc.), the logic configured to receive and/or transmit information 1105 can include a wireless communications interface (e.g., Bluetooth, WiFi, 2G, 3G, etc.) such as a wireless transceiver and associated hardware (e.g., an RF antenna, a MODEM, a modulator and/or demodulator, etc.). In another example, the logic configured to receive and/or transmit information 1105 can correspond to a wired communications interface (e.g., a serial connection, a USB or Firewire connection, an Ethernet connection through which the Internet 175 can be accessed, etc.). Thus, if the communication device 1100 corresponds to some type of network-based server (e.g., SGSN 160, GGSN 165, application server 170, etc.), the logic configured to receive and/or transmit information 1105 can correspond to an Ethernet card, in an example, that connects the network-based server to other communication entities via an Ethernet protocol. In a further example, the logic configured to receive and/or transmit information 1105 can include sensory or measurement hardware by which the communication device 1100 can monitor its local environment (e.g., an accelerometer, a temperature sensor, a light sensor, an antenna for monitoring local RF signals, etc.). The logic configured to receive and/or transmit information 1105 can also include software that, when executed, permits the associated hardware of the logic configured to receive and/or transmit information 1105 to perform its reception and/or transmission function(s). However, the logic configured to receive and/or transmit information 1105 does not correspond to software alone, and the logic configured to receive and/or transmit information 1105 relies at least in part upon hardware to achieve its functionality.

Referring to FIG. 11, the communication device 1100 further includes logic configured to process information 1110. In an example, the logic configured to process information 1110 can include at least a processor. Example implementations of the type of processing that can be performed by the logic configured to process information 1110 includes but is not limited to performing determinations, establishing connections, making selections between different information options, performing evaluations related to data, interacting with sensors coupled to the communication device 1100 to perform measurement operations, converting information from one format to another (e.g., between different protocols such as .wmv to .avi, etc.), and so on. For example, the processor included in the logic configured to process information 1110 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 1110 can also include software that, when executed, permits the associated hardware of the logic configured to process information 1110 to perform its processing function(s). However, the logic configured to process information 1110 does not correspond to software alone, and the logic configured to process information 1110 relies at least in part upon hardware to achieve its functionality.

Referring to FIG. 11, the communication device 1100 further includes logic configured to store information 1115. In an example, the logic configured to store information 1115 can include at least a non-transitory memory and associated hardware (e.g., a memory controller, etc.). For example, the non-transitory memory included in the logic configured to store information 1115 can correspond to RAM memory, flash memory, ROM memory, EPROM memory, EEPROM memory, registers, hard disk, a removable disk, a CD-ROM, or any other form of storage medium known in the art. The logic configured to store information 1115 can also include software that, when executed, permits the associated hardware of the logic configured to store information 1115 to perform its storage function(s). However, the logic configured to store information 1115 does not correspond to software alone, and the logic configured to store information 1115 relies at least in part upon hardware to achieve its functionality.

Referring to FIG. 11, the communication device 1100 further optionally includes logic configured to present information 1120. In an example, the logic configured to display information 1120 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 1100. For example, if the communication device 1100 corresponds to UE 200 as shown in FIG. 3, the logic configured to present information 1120 can include the display 224. In a further example, the logic configured to present information 1120 can be omitted for certain communication devices, such as network communication devices that do not have a local user (e.g., network switches or routers, remote servers, etc.). The logic configured to present information 1120 can also include software that, when executed, permits the associated hardware of the logic configured to present information 1120 to perform its presentation function(s). However, the logic configured to present information 1120 does not correspond to software alone, and the logic configured to present information 1120 relies at least in part upon hardware to achieve its functionality.

Referring to FIG. 11, the communication device 1100 further optionally includes logic configured to receive local user input 1125. In an example, the logic configured to receive local user input 1125 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 1100. For example, if the communication device 1100 corresponds to UE 200 as shown in FIG. 3, the logic configured to receive local user input 1125 can include the display 224 (if implemented a touch-screen), buttons 226, etc. In a further example, the logic configured to receive local user input 1125 can be omitted for certain communication devices, such as network communication devices that do not have a local user (e.g., network switches or routers, remote servers, etc.). The logic configured to receive local user input 1125 can also include software that, when executed, permits the associated hardware of the logic configured to receive local user input 1125 to perform its input reception function(s). However, the logic configured to receive local user input 1125 does not correspond to software alone, and the logic configured to receive local user input 1125 relies at least in part upon hardware to achieve its functionality.

Referring to FIG. 11, while the configured logics of 1105 through 1125 are shown as separate or distinct blocks in FIG. 11, it will be appreciated that the hardware and/or software by which the respective configured logic performs its functionality can overlap in part. For example, any software used to facilitate the functionality of the configured logics of 1105 through 1125 can be stored in the non-transitory memory associated with the logic configured to store information 1115, such that the configured logics of 1105 through 1125 each performs their functionality (i.e., in this case, software execution) based in part upon the operation of software stored by the logic configured to store information 1105. Likewise, hardware that is directly associated with one of the configured logics can be borrowed or used by other configured logics from time to time. For example, the processor of the logic configured to process information 1110 can format data into an appropriate format before being transmitted by the logic configured to receive and/or transmit information 1105, such that the logic configured to receive and/or transmit information 1105 performs its functionality (i.e., in this case, transmission of data) based in part upon the operation of hardware (i.e., the processor) associated with the logic configured to process information 1110. Further, the configured logics or "logic configured to" of 1105 through 1125 are not limited to specific logic gates or elements, but generally refer to the ability to perform the functionality describe herein (either via hardware or a combination of hardware and software). Thus, the configured logics or "logic configured to" of 1105 through 1125 are not necessarily implemented as logic gates or logic elements despite sharing the word "logic". Other interactions or cooperation between the configured logics 1105 through 1125 will become clear to one of ordinary skill in the art from a review of the embodiments described above.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of managing power supplied by distributed power production units in a power distribution system, comprising:
    monitoring a set of parameters, by a power monitoring meter, associated with future power production capacity of a set of distributed power production units that belong to a power group associated with a dynamic group-negotiated price for power supplied by the power group to a given serving area of a public or private power grid during a given period of time;
    predicting by the power monitoring meter, for a portion of the given period of time, a temporary power production disruption that will affect the power group based on the monitoring; and
    sending a control message, by the power monitoring meter, to prompt the power group to begin storing power prior to the portion of time for conditioning power output during the portion of time.

2. The method of claim 1, wherein the temporary power disruption corresponds to a short-term weather fluctuation, a short-term voltage, phase or current fluctuation in the public or private power grid, a scheduled dispatch of a repair crew to service a given portion of the public or private power grid and/or information related to energy price fluctuations.

3. The method of claim 2, wherein the short-term weather fluctuation is a cloud in proximity to the power group.

4. The method of claim 1, wherein the sending step sends the control message to facilitate the set of distributed power production units belonging to the power group to store sufficient power to condition power supplied to the given serving area during the portion of time.

5. A method of supplying power by a distributed power production unit in a power distribution system, comprising:
    supplying power by the distributed power production unit to a given serving area of a public or private power grid during a given period of time, the distributed power production unit belonging to a power group that includes a set of distributed power production units with a dynamic group-negotiated price for power supplied by the power group to the given serving area during the given period of time;
    receiving, during the supplying step, a control message to prompt the distributed power production unit to begin storing power in anticipation of a temporary power production disruption at the distributed power production unit;
    diverting at least a portion of the power being supplied to the given serving area and storing the diverted power responsive to the received control message;
    detecting the temporary power disruption at the distributed power production unit; and
    conditioning power supplied to the given serving area during the temporary power distribution based upon the stored power.

6. The method of claim 5, wherein the temporary power disruption corresponds to a short-term weather fluctuation, a short-term voltage, phase or current fluctuation in the public or private power grid, a scheduled dispatch of a repair crew to service a given portion of the public or private power grid and/or information related to energy price fluctuations.

7. The method of claim 6, wherein the short-term weather fluctuation is a cloud in proximity to the power group.

8. The method of claim 5, further comprising:
    determining that the storing step stores a threshold level of power prior to the detecting step; and
    stopping the diverting step in response to the determination such that the diverted power is again supplied to the given serving area by the supplying step.

9. The method of claim 5, wherein the diverting diverts all of the power being supplied to the public or private power grid after the control message is received and before the detecting step.

10. The method of claim 5, wherein the diverting steps diverts less than all of the power being supplied to the public or private power grid after the control message is received and before the detecting step.

11. The method of claim 5, wherein the diverting step begins immediately upon receipt of the control message.

12. The method of claim 5, wherein the diverting step begins at a scheduled time before the detecting step that is not immediately upon receipt of the control message.

13. A server configured to manage power supplied by distributed power production units in a power distribution system, comprising:
    means for monitoring a set of parameters associated with future power production capacity of a set of distributed power production units that belong to a power group associated with a dynamic group-negotiated price for power supplied by the power group to a given serving area of a public or private power grid during a given period of time;
    means for predicting, for a portion of the given period of time, a temporary power production disruption that will affect the power group based on the monitoring; and
    means for sending a control message to prompt the power group to begin storing power prior to the portion of time for conditioning power output during the portion of time.

14. A distributed power production unit configured to supply power in a power distribution system, comprising:
    means for supplying power to a given serving area of a public or private power grid during a given period of time, the distributed power production unit belonging to a power group that includes a set of distributed power production units with a dynamic group-negotiated price for power supplied by the power group to the given serving area during the given period of time;
    means for receiving, during the supplying, a control message to prompt the distributed power production unit to begin storing power in anticipation of a temporary power production disruption at the distributed power production unit;
    means for diverting at least a portion of the power being supplied to the given serving area and storing the diverted power responsive to the received control message;

means for detecting the temporary power disruption at the distributed power production unit; and means for conditioning power supplied to the given serving area during the temporary power distribution based upon the stored power.

15. A server configured to manage power supplied by distributed power production units in a power distribution system, comprising:

logic configured to monitor a set of parameters associated with future power production capacity of a set of distributed power production units that belong to a power group associated with a dynamic group-negotiated price for power supplied by the power group to a given serving area of a public or private power grid during a given period of time;

logic configured to predict, for a portion of the given period of time, a temporary power production disruption that will affect the power group based on the monitoring; and logic configured to send a control message to prompt the power group to begin storing power prior to the portion of time for conditioning power output during the portion of time.

16. A distributed power production unit configured to supply power in a power distribution system, comprising:

logic configured to supply power to a given serving area of a public or private power grid during a given period of time, the distributed power production unit belonging to a power group that includes a set of distributed power production units with a dynamic group-negotiated price for power supplied by the power group to the given serving area during the given period of time;

logic configured to receive, during the supplying, a control message to prompt the distributed power production unit to begin storing power in anticipation of a temporary power production disruption at the distributed power production unit;

logic configured to divert at least a portion of the power being supplied to the given serving area and storing the diverted power responsive to the received control message;

logic configured to detect the temporary power disruption at the distributed power production unit; and logic configured to condition power supplied to the given serving area during the temporary power distribution based upon the stored power.

17. A non-transitory computer-readable medium containing instructions stored thereon, which, when executed by a server configured to manage power supplied by distributed power production units in a power distribution system, cause the server to perform operations, the instructions comprising:

program code to monitor a set of parameters associated with future power production capacity of a set of distributed power production units that belong to a power group associated with a dynamic group-negotiated price for power supplied by the power group to a given serving area of a public or private power grid during a given period of time;

program code to predict, for a portion of the given period of time, a temporary power production disruption that will affect the power group based on the monitoring; and program code to send a control message to prompt the power group to begin storing power prior to the portion of time for conditioning power output during the portion of time.

18. A non-transitory computer-readable medium containing instructions stored thereon, which, when executed by a distributed power production unit configured to supply power in a power distribution system, cause the distributed power production unit to perform operations, the instructions comprising:

program code to supply power by the distributed power production unit to a given serving area of a public or private power grid during a given period of time, the distributed power production unit belonging to a power group that includes a set of distributed power production units with a dynamic group-negotiated price for power supplied by the power group to the given serving area during the given period of time;

program code to receive, during the supplying, a control message to prompt the distributed power production unit to begin storing power in anticipation of a temporary power production disruption at the distributed power production unit;

program code to divert at least a portion of the power being supplied to the given serving area and storing the diverted power responsive to the received control message;

program code to detect the temporary power disruption at the distributed power production unit; and program code to condition power supplied to the given serving area during the temporary power distribution based upon the stored power.

\* \* \* \* \*